US007533908B2

(12) United States Patent
Vogel et al.

(10) Patent No.: US 7,533,908 B2
(45) Date of Patent: May 19, 2009

(54) COUPLING ASSEMBLY AND RETAINER FOR USE WITH SAME

(75) Inventors: Todd J. Vogel, Waterville, OH (US); Michael P. Wells, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/780,293

(22) Filed: Jul. 19, 2007

(65) Prior Publication Data

US 2008/0018107 A1 Jan. 24, 2008

Related U.S. Application Data

(60) Provisional application No. 60/807,759, filed on Jul. 19, 2006.

(51) Int. Cl.
*F16L 37/138* (2006.01)

(52) U.S. Cl. ........................ 285/321; 285/316; 285/314

(58) Field of Classification Search ................. 285/321, 285/307, 309, 316, 308, 314
See application file for complete search history.

(56) References Cited

U.S. PATENT DOCUMENTS 4,376,525 A * 3/1983 Fremy ..................... 251/149.6
4,561,682 A * 12/1985 Tisserat ...................... 285/305
4,721,331 A 1/1988 Lemelshtrich
5,090,747 A * 2/1992 Kotake ....................... 285/305
5,211,427 A * 5/1993 Washizu ...................... 285/23
5,366,259 A * 11/1994 Hohmann et al. ........... 285/305
5,425,558 A * 6/1995 Dennany, Jr. ............... 285/308
5,542,716 A 8/1996 Szabo et al.
5,683,117 A 11/1997 Corbett et al.
5,707,085 A * 1/1998 Kubiak ........................ 285/86
6,129,390 A 10/2000 Ohlsson
6,142,537 A * 11/2000 Shimada et al. ............. 285/308
6,186,557 B1 * 2/2001 Funk ........................... 285/39
6,293,596 B1 9/2001 Kinder
6,305,721 B1 * 10/2001 Heinrichs et al. ............. 285/23
6,517,121 B1 * 2/2003 Cresswell ................... 285/321
6,533,330 B1 3/2003 Davidson et al.
6,604,760 B2 * 8/2003 Cresswell et al. ........... 285/305
6,634,679 B1 10/2003 Stieler
6,857,664 B2 2/2005 Ohlsson

* cited by examiner

*Primary Examiner*—David E Bochna
(74) *Attorney, Agent, or Firm*—Benesch, Friedlander, Coplan & Aronoff LLP

(57) ABSTRACT

A coupling assembly having male and female coupling members that are connectable and separable from each other. The coupling assembly utilizes a resiliently expandable locking element, which is provided on the male coupling member, to connect the male and female coupling members together by trapping the locking element, in its expanded position, between respective locking surfaces of the male and female coupling members. A locking sleeve, which is movable between unlocked and locked positions, is employed to move the locking element to its expanded position. In this position, the locking element prevents the withdrawal of the male coupling member from the female coupling member by creating a positive lock therebetween. To maintain the locking sleeve in its locked position, a retainer can be used.

27 Claims, 20 Drawing Sheets

10 18 82 80 28 42 40 44 46 68 64 36 34 16 22 24 20 84 66 74 26 A A 86 90 88 78 58 52 72 76 70 54 50 48 62 60 56 14 12

COUPLING ASSEMBLY AND RETAINER FOR USE WITH SAME

CROSS-REFERENCE TO RELATED APPLICATION

This application claims priority to U.S. Provisional Application No. 60/807,759 filed on Jul. 19, 2006, the disclosure of which is hereby incorporated by reference in its entirety herein.

BACKGROUND

1. Field of the Invention

The present application relates to coupling assemblies and, more particularly, to fluid coupling assemblies that include an expandable locking element.

2. Description of the Related Art

Coupling assemblies for the transmission of gases or fluids that are secured together by axial movement of a male coupling member into a female coupling member are known in the art. In one such coupling assembly described in U.S. Pat. No. 5,570,910, a resiliently expandable locking ring is employed to secure a male coupling member within a female coupling member. In this design, with the exception of the release sleeve, all of the functional components of the coupling assembly (e.g., the locking ring and the sealing member) are provided in the female coupling member. Because of this, the internal geometry of the female coupling member is complicated requiring costly machining techniques. Additionally, it is difficult and costly to assemble the components inside the female coupling member. There are continual efforts to improve upon the current designs of coupling assemblies, particularly to reduce the complexity and cost of the mating male and female coupling members.

SUMMARY

A coupling assembly is provided that includes a first member and a second member. The first member extends from a leading end to a trailing end and has an outer surface and a first locking surface that extends outwardly from the outer surface towards the leading end of the first member. The second member extends from a receiving end to a remote end and has an inner surface sized to receive at least a portion of the first member and an inwardly facing groove extending outwardly from the inner surface. The groove is at least partially defined by a second locking surface that extends outwardly from the inner surface towards the remote end of the second member. The coupling assembly further includes a locking sleeve disposed about and axially movable with respect to the outer surface of the first member between unlocked and locked positions and a resilient locking element (e.g., a split locking ring) disposed about the outer surface between the locking sleeve and the first locking surface of the first member. After insertion of the first member into the second member and upon movement of the locking sleeve from its unlocked position to its locked position, the locking sleeve forces the locking element to expand radially outward, such that it becomes trapped between the first locking surface of the first member and the second locking surface of the second member, thereby locking the first and second members together. The first locking surface can be defined by a surface of a support element, such as a split locking ring positioned in an outwardly facing groove that extends inwardly from the outer surface, or can be defined by a chamfered surface of a rib extending outwardly from the outer surface. To maintain the locking sleeve in its locked position, a retainer can be used.

A coupling assembly is also provided including first and second members movable with respect to each other between uncoupled and coupled positions. The first member extends from a leading end to a trailing end and has an outer surface and a first locking surface that extends outwardly from the outer surface towards the leading end of the first member. The second member extending from a receiving end to a remote end and has an inner surface and an inwardly facing groove extending outwardly from the inner surface. The groove is at least partially defined by a second locking surface that extends outwardly from the inner surface towards the remote end of the second member. The coupling assembly further includes a locking sleeve disposed about and axially movable with respect to the outer surface of the first member between unlocked and locked positions, a biasing element (e.g., a compression spring or a wave washer) configured to bias the locking sleeve to its locked position, and a resilient locking element (e.g., a split locking ring) disposed about the outer surface between the locking sleeve and the first locking surface of the first member. The locking element is movable between contracted and expanded positions by the biased locking sleeve, wherein the locking element engages the outer surface of the first member in its contracted position and is moved radially outward in its expanded position, such that it is disengaged from the outer surface of the first member and engages the locking sleeve and the first locking surface of the first member. The locking element is in its expanded position and the locking sleeve is in its locked position when the first and second members are in the uncoupled position. Upon insertion of the first member into the second member, the locking element is forced to move from its expanded position to its contracted position, thereby forcing the locking sleeve to move rearward against the urging of the biasing element. Upon continued insertion of the first member into the second member and once the locking element is generally aligned with the groove in the second member, the biasing element forces the locking sleeve to move forward causing the locking element to move radially outward from its contracted position to its expanded position, such that it becomes trapped between the first locking surface of the first member and the second locking surface of the second member, thereby locking the first and second members together. The first locking surface can be defined by a surface of a support element, such as a split locking ring positioned in an outwardly facing groove that extends inwardly from the outer surface, or can be defined by a chamfered surface of a rib extending outwardly from the outer surface.

A retaining clip is provided for use with an axially displaceable coupling assembly to maintain the coupling assembly in its connected position and/or prevent involuntary disconnection of the coupling assembly, where the coupling assembly includes male and female couplings and a locking sleeve axially movable between locked and unlocked positions. The male coupling has first and second outer surfaces separated by a shoulder where the first outer surface has a larger diameter than the second outer surface, wherein the locking sleeve and the second outer surface and the shoulder of the male coupling form a groove therebetween. The retaining clip includes a resilient C-shaped member movable from an expanded position to a contracted position and configured to be installed on the first outer surface of the male coupling when in its expanded position. Upon axial movement of the C-shaped member towards the second outer surface, the C-shaped member moves to its contracted position, due to its resiliency, where it is received in the groove and engages the second outer surface of the male coupling. When in its contracted position and positioned in the groove, the C-shaped member maintains the locking sleeve in its locked position, thereby preventing axial movement of the locking sleeve to its unlocked position.

A retainer is also provided for use with an axially displaceable coupling assembly to maintain the coupling assembly in its connected position and/or prevent involuntary disconnection of the coupling assembly, where the coupling assembly includes male and female couplings. The retainer includes first and second members configured to be in sliding engagement with each other and movable relative to each other between first and second positions. The first and second members define an opening therebetween that is sized to permit the slidingly engaged first and second members to be received by the male coupling. When moved between their first and second positions, the first and second members are configured to vary the size of the opening and the thickness of the retainer adjacent the opening. When the first and second members are moved to the first position, the thickness of the retainer adjacent the opening is sized to permit disconnection of the coupling assembly. When the first and second members are moved to the second position, the thickness of the retainer adjacent the opening is increased to a size that maintains the coupling assembly in its connected position.

BRIEF DESCRIPTION OF THE DRAWINGS

It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1A:
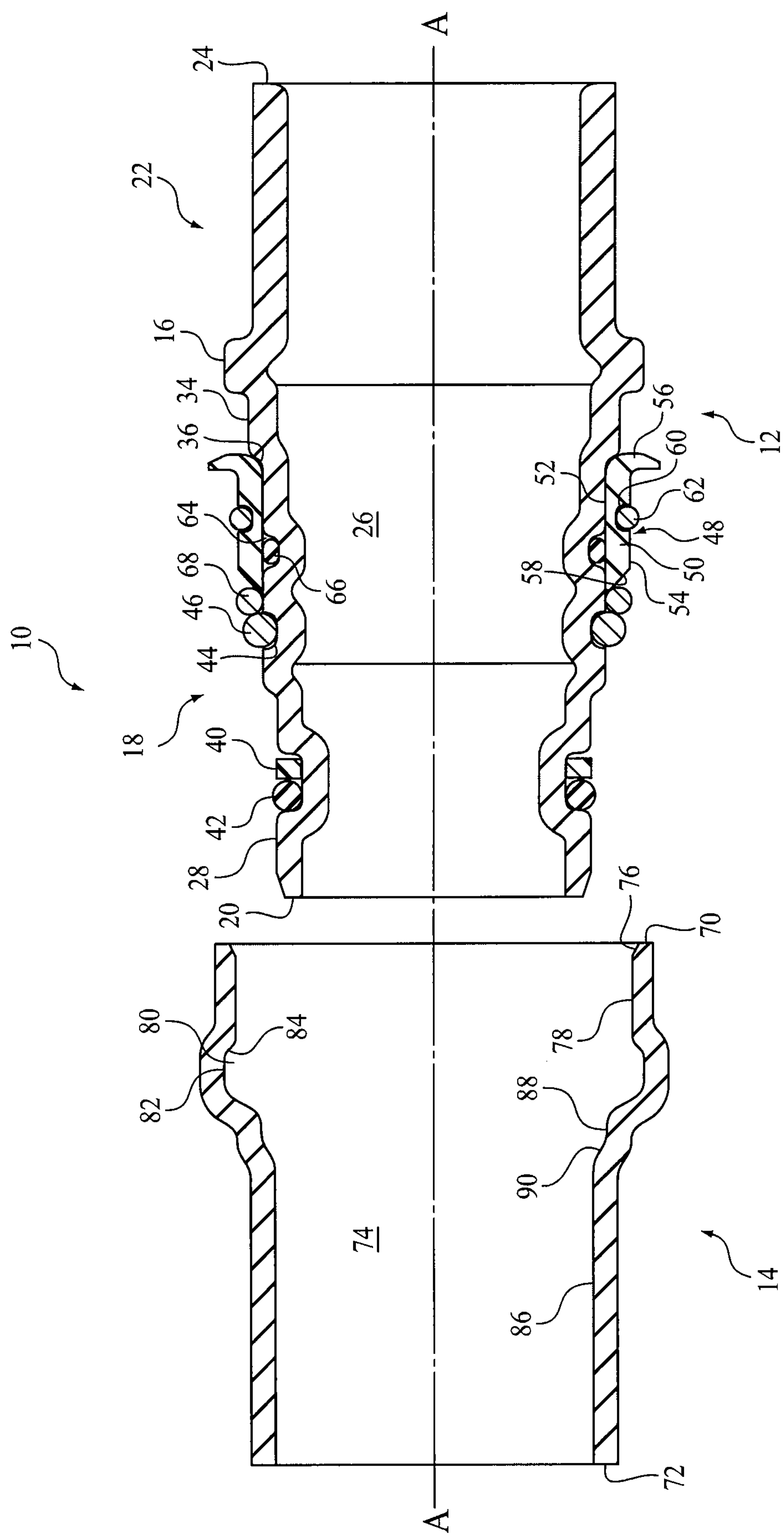
FIGS. 1A and 1B illustrate cross-sectional views of one embodiment of a coupling assembly 10 in the uncoupled and coupled positions, respectively.

Certain terminology will be used in the following description for convenience in reference only and will not be limiting. The terms "forward" and "rearward" with respect to each component of the coupling assembly will refer to a direction towards and away from the coupling direction, respectively. The terms "rightward" and "leftward" will refer to directions in the drawings in connection with which the terminology is used. The terms "inwardly" and "outwardly" will refer to directions toward and away from, respectively, the geometric centerline of the coupling assembly. The terms "upward" and "downward" will refer to directions as taken in the drawings in connection with which the terminology is used. All foregoing terms mentioned above include the normal derivative and equivalents thereof.

The present application is directed to multiple embodiments of a fluid coupling assembly having male and female coupling members that are connectable and separable from each other. The fluid coupling assembly utilizes a resiliently expandable locking element, which is provided on the male coupling member, to connect the male and female coupling members together by trapping the locking element, in its expanded position, between respective locking surfaces of the male and female coupling members. In this position, the locking element prevents the withdrawal of the male coupling member from the female coupling member by creating a positive lock therebetween.

Figure 1B:
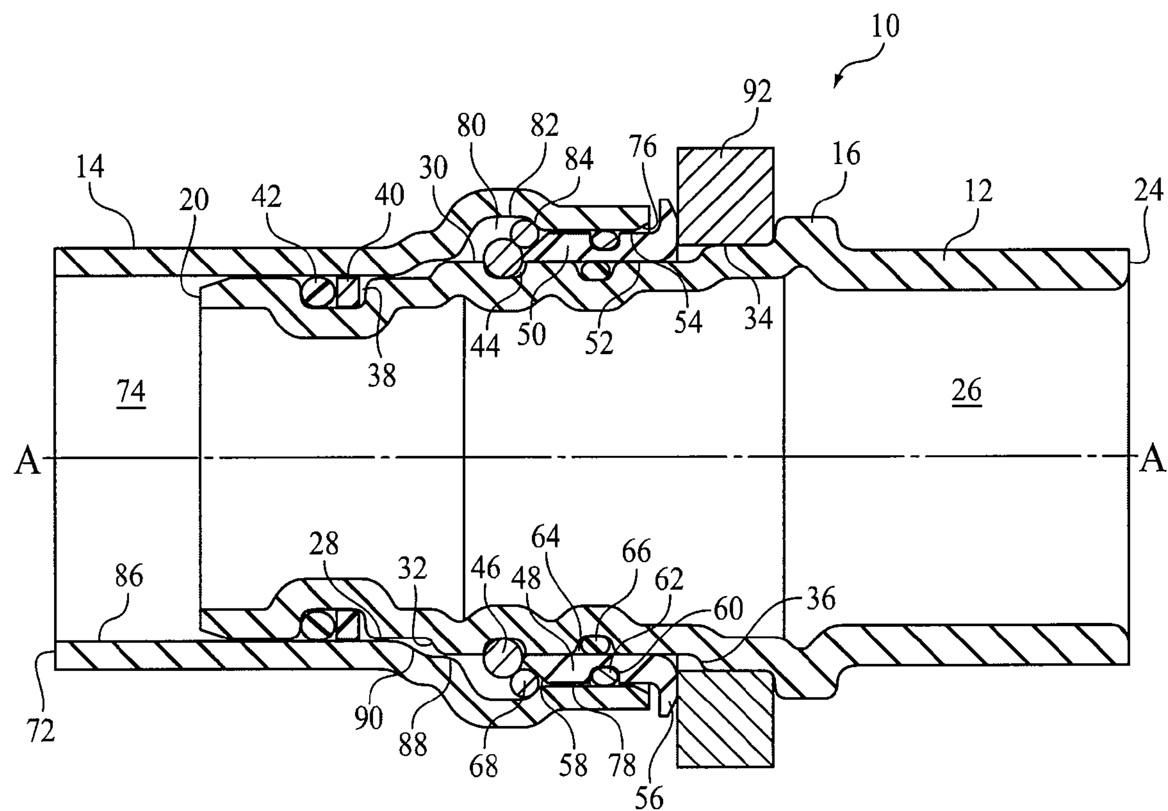

Illustrated in FIGS. 1A and 1B are cross-sectional views of one embodiment of a coupling assembly 10 shown in the uncoupled position and coupled position, respectively. The coupling assembly 10 includes a first member 12 and a second member 14. The first member 12 generally functions as the "male" coupling member of the coupling assembly 10 and the second member 14 generally functions as the "female" coupling member of the coupling assembly 10, such that the second member 14 is configured to receive the first member 12. Both the first and second members 12, 14 share the same central longitudinal axis A when they are in the coupled position as shown in FIG. 1B. In one embodiment, the first and second members 12, 14 can be formed of stainless steel.

In alternative embodiments, the first and second members 12, 14 can be formed of other materials, such as carbon steel, brass, aluminum, and plastic.

In the illustrated embodiment, the first member 12 includes a collar 16 that separates a leading portion 18 having a leading end 20 from a trailing portion 22 having a trailing end 24. Extending through the first member 12 from the leading end 20 to the trailing end 24 is a passageway 26 that permits fluid to flow therethrough. In one embodiment (not shown), the trailing portion 22 of the first member 12 can be connected to a hose nipple for receiving a hose. In an alternative embodiment (not shown), the trailing portion 22 may be provided with external threads for attachment to a threaded coupling of another component.

The leading portion 18 of the first member 12 includes a first outer cylindrical surface 28 and a second outer cylindrical surface 30 separated from each other by a first shoulder 32. Additionally, the leading portion 18 of the first member 12 includes a third outer cylindrical surface 34 separated from the second outer surface 30 by a second shoulder 36. In an alternative embodiment (not shown), the leading portion 18 of the first member 12 can include less than two outer cylindrical surfaces or more than three outer cylindrical surfaces having different outer diametrical sizes.

In the illustrated embodiment, the first outer surface 28 includes an outwardly facing annular groove 38 extending radially inward therefrom. Positioned within the groove 38 are a backup ring 40 constructed of rigid plastic, leather, or hard rubber, and an annular seal 42 constructed of neoprene or other suitable sealing material. The annular seal 42 is positioned in the groove 36 between the backup ring 40 and the leading end 20 of the first member 12. The backup ring 40 serves to protect the annular seal 42 from damage when the coupling assembly 10 is used in high-pressure applications. In another embodiment (not shown), the backup ring 40 may be eliminated when the coupling assembly is used in low-pressure applications. In another alternative embodiment (not shown), the annular seal and the backup ring may be received in a groove in the second member 14.

The second outer surface 30 includes a first outwardly facing annular groove 44 extending radially inward therefrom. Positioned within the first groove 44 is an annular support element such as, for example, a first split, resiliently expandable locking ring 46. In the illustrated embodiment, the first locking ring 46 has a circular cross-section and a larger outer diameter than the second outer surface 30. The first locking ring 46 serves as one of the locking surfaces configured to assist in locking the first and second members 12, 14 together, which will be discussed in more detail below. In alternative embodiments (not shown), the split locking ring can have a different cross-section such as triangular, trapezoidal, and square. In other words, the locking surface can have a linear or curved (e.g., concave or convex) profile when viewed in cross section. In one embodiment, the first locking ring 46 can be formed of stainless spring steel. In alternative embodiments, the first locking ring 46 can be formed of other metals such as a spring tempered phosphoric bronze material or carbon steel.

The first member 12 also includes a locking sleeve 48 provided between the first locking ring 46 and the second shoulder 36. The locking sleeve 48 includes a sleeve portion 50 having an inner cylindrical surface 52 and an outer cylindrical surface 54, and a flange portion 56 that extends radially outward from the sleeve portion 50. Although the locking sleeve 48 is generally L-shaped when viewed in cross-section relative to the longitudinal axis A, the locking sleeve may take the form of other profiles when viewed in cross-section.

At its forward end, the sleeve portion 50 has a beveled end surface 58 that tapers forward and towards the longitudinal axis A of the first and second members 12, 14. In the illustrated embodiment, the angle of the beveled end surface 58 is 45° relative to the longitudinal axis A of the first and second members 12, 14. It will be appreciated that the angle of the beveled end surface 58 relative to the longitudinal axis A of the first and second members 12, 14 can vary depending on the design.

The inner surface 52 of the locking sleeve 48 is seated on the second outer surface 30 in an axially movable arrangement, such that the locking sleeve 48 is movable between unlocked and locked positions. Axial travel of the locking sleeve 48 is limited in the rearward direction by the second shoulder 36 and in the forward direction by the first locking ring 46. The locking sleeve 48 is in the unlocked position as shown in FIG. 1A and in the locked position as shown in FIG. 1B.

The outer surface 54 of the locking sleeve 48 includes an outwardly facing annular groove 60 extending radially inward therefrom. Positioned within the groove 60 is an annular seal 62 constructed of neoprene or other suitable sealing material. In an alternative embodiment (not shown), the groove 60 and/or the annular seal 62 may be eliminated from the coupling assembly 10. In another alternative embodiment (not shown), the annular seal may be received in a groove in the second member 14.

In the illustrated embodiment, the second outer surface 30 includes a second outwardly facing annular groove 64 extending radially inward therefrom. Positioned within the second groove 64 is an annular seal 66 constructed of neoprene or other suitable sealing material. The annular seal 66 sealingly engages the inner outer surface 52 of the locking sleeve 48, thereby preventing dust or other contaminants from entering the area forward of the annular seal 62. In an alternative embodiment (not shown), the groove 64 and annular seal 66 may be eliminated from the coupling assembly 10.

The first member 12 further includes an annular resilient locking element disposed about the second outer surface 30 between the first locking ring 46 and the beveled end surface 58 of the locking sleeve 48. In the illustrated embodiment, the annular resilient locking element is a second split, resiliently expandable locking ring 68 that is movable between contracted and expanded positions. In the contracted position, as shown in FIG. 1A, the second locking ring 68 has a larger outer diameter than the first locking ring 46 and an inner diameter sized to snugly engage the second outer surface 30 of the first member 12. By virtue of being split, the second locking ring 68 is capable of being expanded radially outward to its expanded position when the locking sleeve 48 is moved to its locked position (FIG. 1B). It will be appreciated that the presence of the first locking ring 46 serves to limit the axial movement of the second locking ring 68, such that the second locking ring 68 is forced to engage and move along the outer surface of the first locking ring 46 as it expands radially outward. Also, by virtue of being resilient, the second locking ring 68 is capable of contracting radially inward to return to its contracted position.

Although, the second locking ring 68 has a circular cross-section in the illustrated embodiment, the second locking ring can have a different cross-section such as, for example, triangular, trapezoidal, or square. In one embodiment, the second locking ring 68 can be formed of stainless spring steel. In alternative embodiments, the second locking ring 68 can be formed of other metals such as a spring tempered phosphoric bronze material, carbon steel, or stainless steel.

With reference to FIG. 1A, the second member 14 includes a receiving end 70 that extends to a remote end 72 and a passageway 74 extending therethrough. Optionally, the second member 14 can include external threads (not shown) provided adjacent to the remote end 72 for attachment to a separate threaded component (not shown). In an alternative embodiment (not shown), the second member 14 can include other suitable connection means for attachment to a separate component (not shown).

In the illustrated embodiment, the second member 14 includes a first chamfered surface 76 that extends rearward and inward from the receiving end 70 and a first inner cylindrical surface 78 that extends rearward from the first chamfered surface 76 and sized to receive therein the second locking ring 68 in its contracted position. Extending radially outward from the first inner surface 78 is an inwardly facing annular groove 80.

The groove 80 is at least partially defined by a second inner cylindrical surface 82 sized to receive therein the second locking ring 68 in its expanded position and a chamfered surface 84 that extends at an angle inwardly from the second inner surface 82 toward the receiving end 70 to meet the first inner surface 78. The chamfered surface 84 serves as the other locking surface configured to assist in locking the first and second members 12, 14 together, which will be discussed in more detail below. In the illustrated embodiment, the angle of the chamfered surface 84 relative to the longitudinal axis A of the first and second members 12, 14 is about 45°. It will be appreciated that the angle of the chamfered surface 84 relative to the longitudinal axis A of the second member 14 can vary depending on the design. Additionally, in alternative embodiments (not shown), the locking surface can have a curved (e.g., concave or convex) profile when viewed in cross section, instead of a linear profile.

The portion of the second member 14 adjacent the remote end 72 includes a third inner cylindrical surface 86 sized to receive therein the first outer surface 28 of the first member 12. Additionally, the third inner surface 86 is sized to snugly receive therein the backup ring 40 on the first member 12 and to sealingly receive and engage the annular seal 42 on the first member 12. Forward of the third inner surface 86 is a fourth inner surface 88 sized to receive therein the second inner surface 30 of the first member 12. Joining the third inner surface 86 to the fourth inner surface 88 is a tapered surface 90 that tapers inwardly toward the remote end 72 of the second member 14.

Figure 2A:
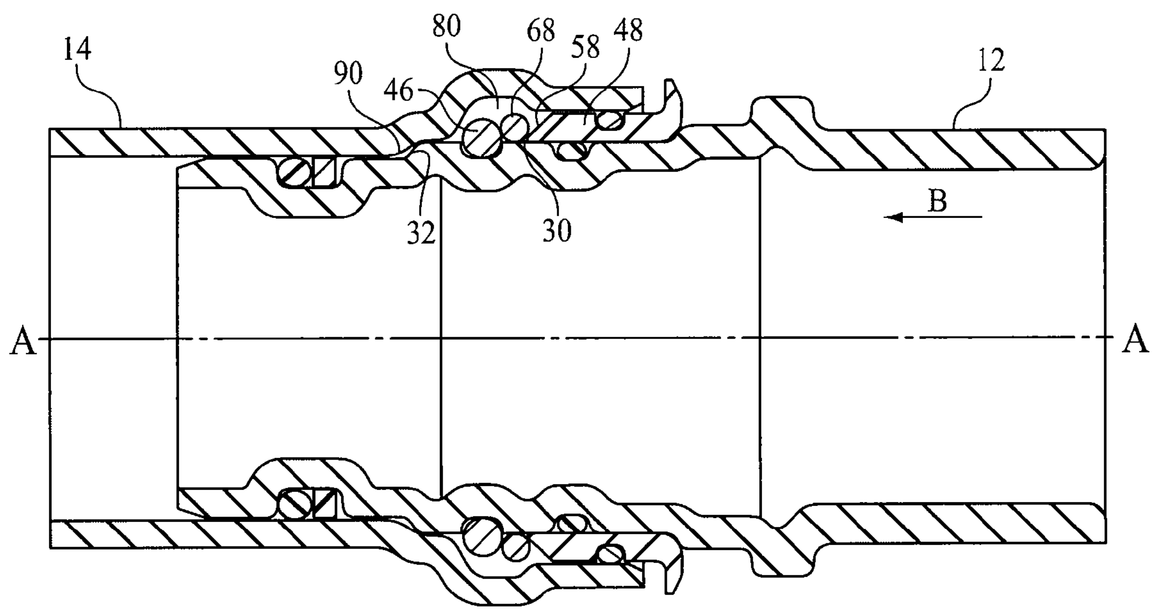
FIGS. 2A-2C illustrate cross-sectional views of the coupling assembly 10 at various stages during the coupling operation.
Figure 2B:
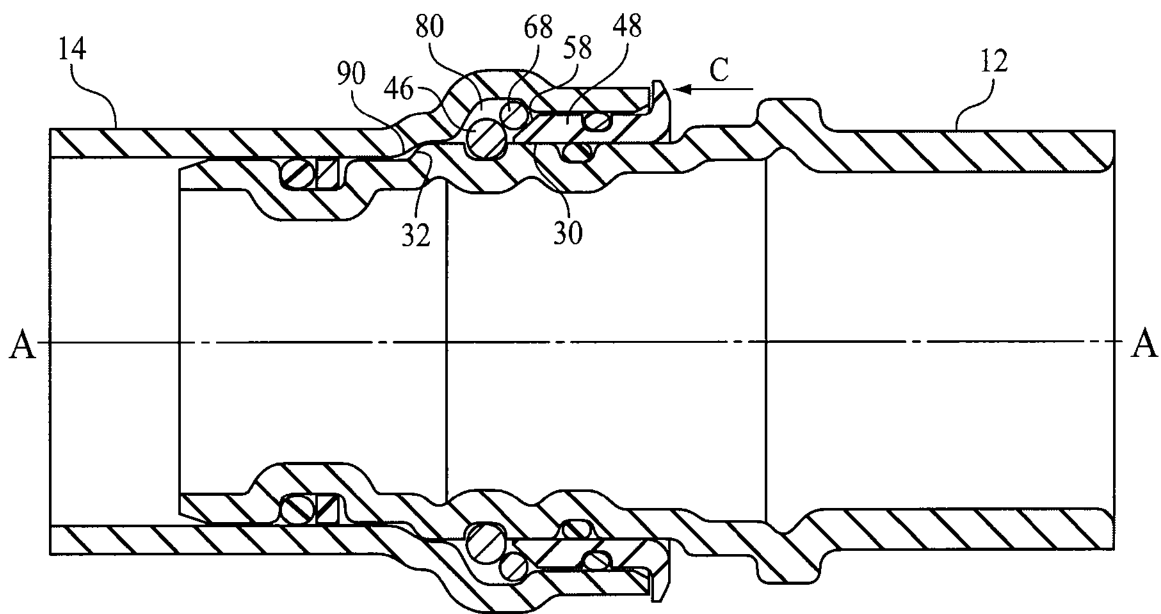
Figure 2C:
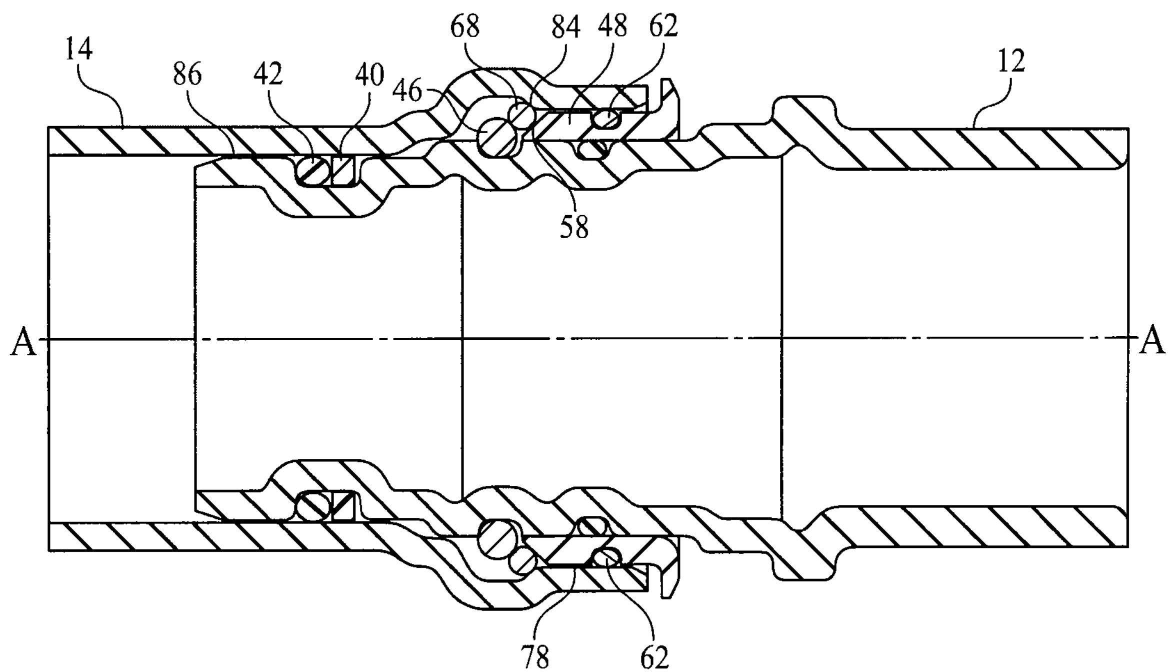

To couple the first and second members 12, 14 together, the first member 12 is initially inserted (in the direction of arrow B) into the second member 14 until the first shoulder 32 of the first member 12 abuts against the tapered surface 90 of the second member 14 (FIG. 2A). Once in this position, the locking sleeve 48 is moved forward (in the direction of arrow C) from its unlocked position until the beveled end surface 58 of the locking sleeve 48 engages the second locking ring 68. Upon continued forward movement of the locking sleeve 48 to its locked position the beveled end surface 58 of the locking sleeve 48 forces the second locking ring 68, by virtue of it being split, to expand radially outward into the groove 80 while moving along the curved surface of the first locking ring 46 (FIG. 2B). Upon pressurization of the coupling assembly 10 and/or slight rearward movement of the first member 12 relative to the second member 14 (or vice versa), the second locking ring 68, now in its expanded position, engages the chamfered surface 84, such that it is trapped between the first locking ring 46 (i.e., one of the locking surfaces) and the chamfered surface 84 (i.e., the other locking surface) (FIG. 2C). In this position, the second locking ring 68 prevents the withdrawal of the first member 12 from the second member 14 by creating a positive lock between the first and second members 12, 14.

To maintain the locking sleeve 48 in its locked position and to prevent involuntary movement of the locking sleeve 48 to its unlocked position, a retainer 92 is positioned within the groove formed between the locking sleeve 48 and the collar 16 as shown in FIG. 1B. Optionally, the retaining clip 92 can also be configured to move the locking sleeve 48 forward to expand the second locking ring 68 radially outward and trap it between the first locking ring 46 and the chamfered surface 84. In one embodiment, the retaining clip 1000 discussed in detail below and illustrated in FIGS. 10A and 10B can be used as the retainer 92. In another embodiment, the retainer 1100 discussed in detail below and illustrated in FIGS. 11A-11G can be used as the retainer 92. It will be appreciated that other retaining devices may be used to maintain the locking sleeve 48 in its locked position and to prevent involuntary movement of the locking sleeve 48 to its unlocked position. Other suitable examples of retaining devices can include a C-shaped clip, a snap ring, and a toggle clip.

When the first and second members 12, 14 are in the coupled position (FIG. 2C), the annular seal 42 on the first member 12 is sealingly engaged to the third inner surface 86 of the second member 14, thereby preventing fluid leakage. Also, when the first and second members 12, 14 are in the coupled position, the annular seal 62 on the locking sleeve 48 is sealingly engaged to the first outer surface 78 of the second member 14, thereby preventing dust or other contaminants from entering the area around the second locking ring 68.

Figure 3A:
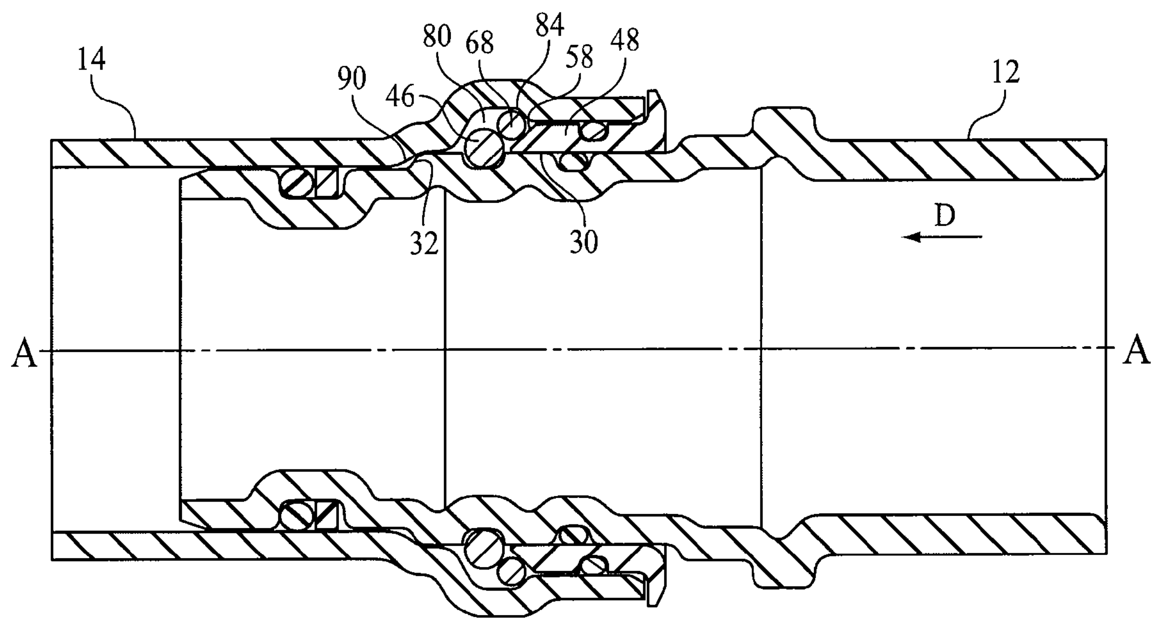
FIGS. 3A-3C illustrate cross-sectional views of the coupling assembly 10 at various stages during the uncoupling operation.
Figure 3B:
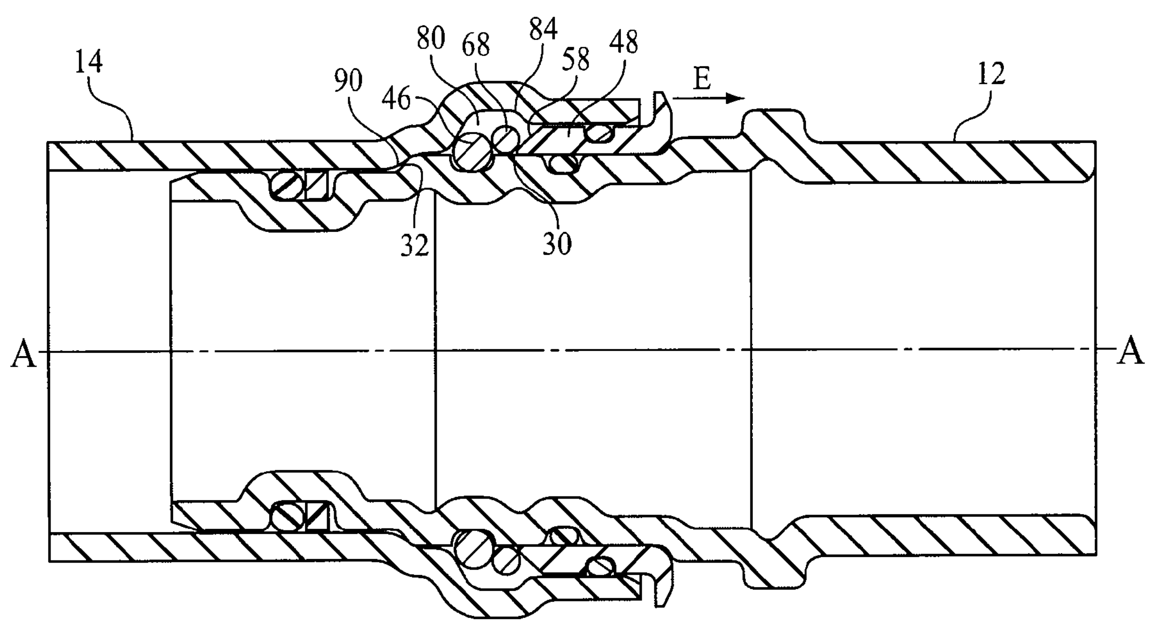
Figure 3C:
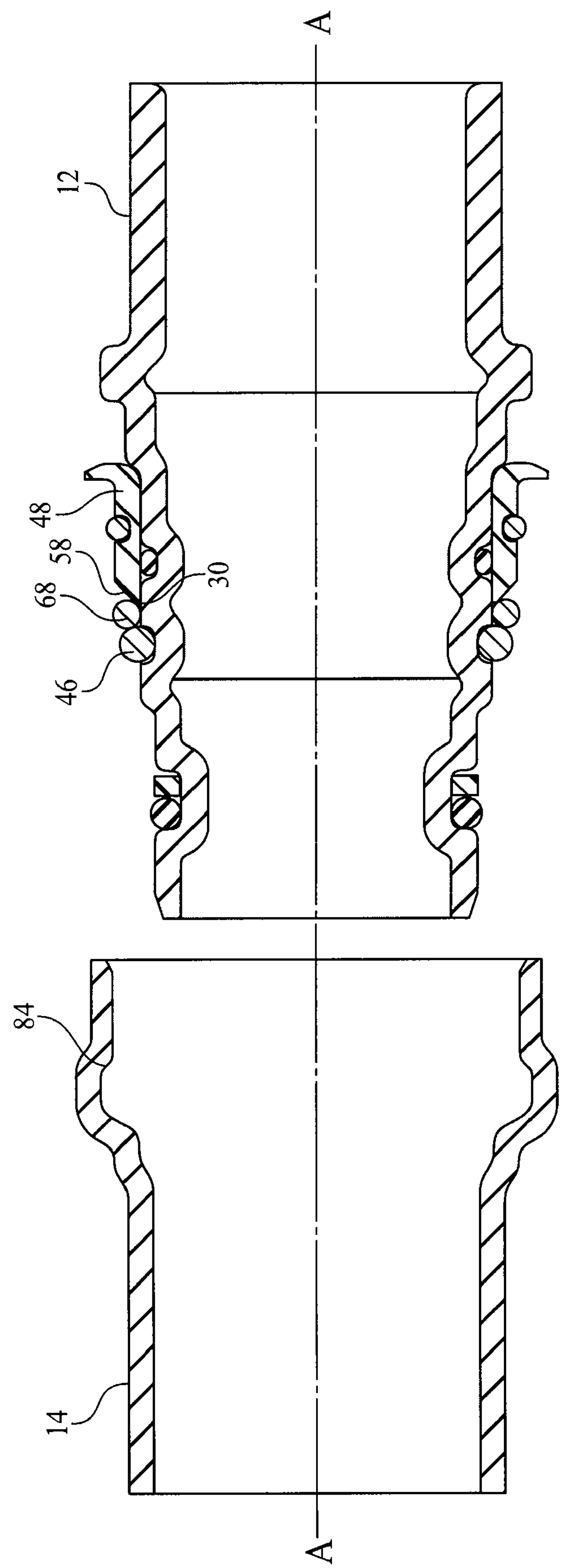

When it is desired to uncouple the first member 12 from the second member 14, the retaining clip 92 is removed (or moved onto the outer surface of the collar 16) and the first member 12 is initially moved forward (in the direction of arrow D) relative to the second member 14 until the first shoulder 32 of the first member 12 abuts against the tapered surface 90 of the second member 14 (FIG. 3A). This forward movement of the first member 12 causes the second locking ring 68 to be disengaged from the chamfered surface 84. The locking sleeve 48 is then moved rearward (in the direction of arrow E) causing the second locking ring 68, by virtue of its resiliency, to contract radially inward to its contracted position and return to its engagement with the second outer surface 30 (FIG. 3B). Once in engagement with the second outer surface 30, the second locking ring 68 will no longer interfere with the chamfered surface 84. This will allow the first member 12 to be disconnected from the second member 14, resulting in the coupling assembly 10 being in the uncoupled position (FIG. 3C).

Figure 4A:
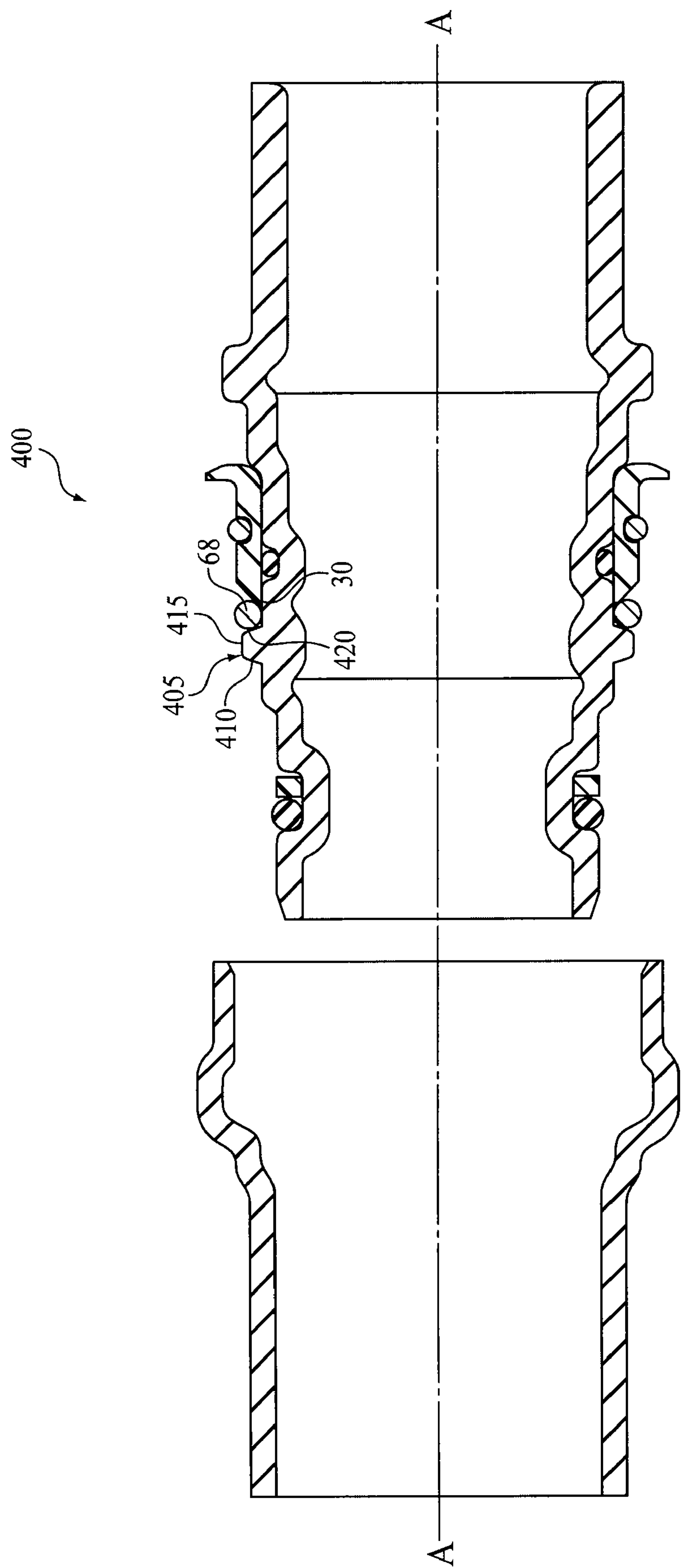
FIGS. 4A and 4B illustrate cross-sectional views of another embodiment of a coupling assembly 400 in the uncoupled and coupled positions, respectively.
Figure 4B:
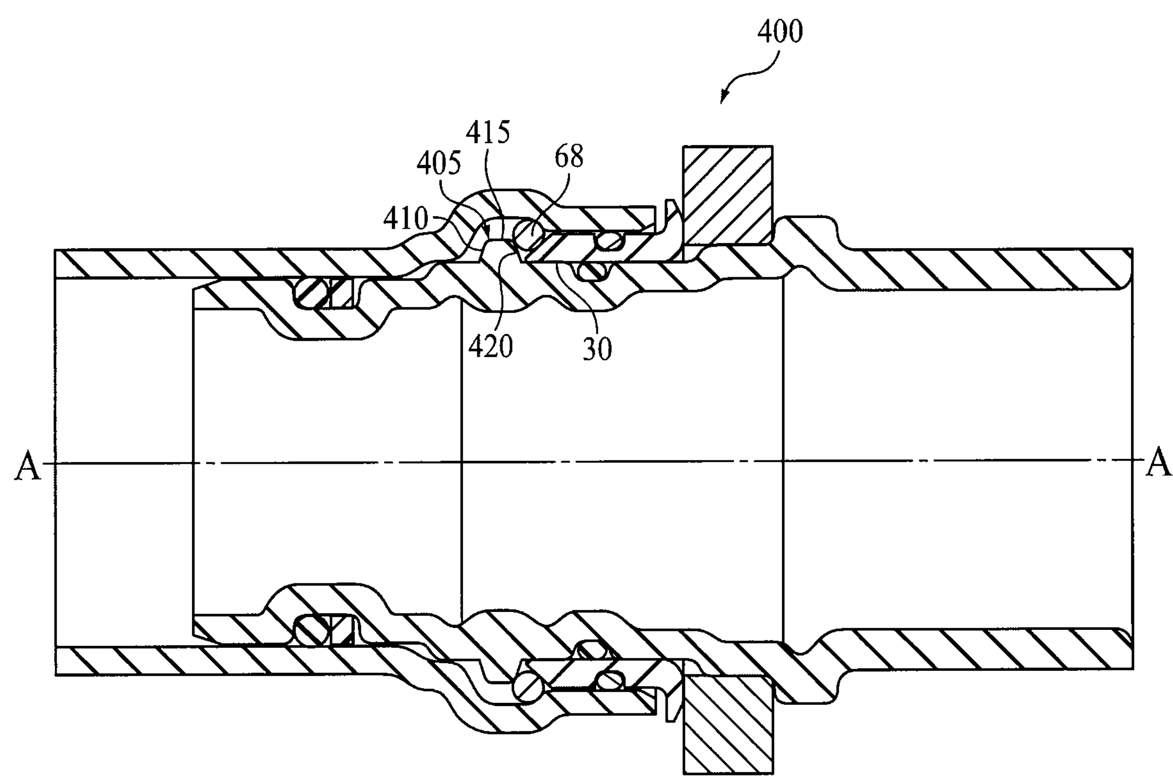

Illustrated in FIGS. 4A and 4B are cross-sectional views of another embodiment of a coupling assembly 400 in the uncoupled and coupled positions, respectively. The coupling assembly 400 is substantially similar to the coupling assembly 10 described above and illustrated in FIGS. 1A and 1B above, with the exception that the coupling assembly 400 includes a rib 405 that serves as the annular support element, rather than a split locking ring.

The rib 405 extends radially outward from the second inner surface 30 of the first member 12. The rib 405 includes a first chamfered surface 410 extending generally rearwardly and outwardly from the second inner surface 30, an outer cylindrical surface 415 extending rearward from the first chamfered surface 410, and a second chamfered surface 420 extending generally rearwardly and inwardly from the outer surface 415 to the second inner surface 30 of the first member 12. Together, these surfaces exhibit a generally trapezoidal profile when viewed in cross-section. The second chamfered surface 420 serves as one of the locking surfaces configured to assist in locking the first and second members 12, 14 together, which will be discussed in more detail below. In the illustrated embodiment, the angle of the second chamfered surface 420 relative to the longitudinal axis A of the first and second members 12, 14 is about 45°. It will be appreciated that the angle of the second chamfered surface 420 relative to the longitudinal axis A can vary depending on the design. Additionally, in alternative embodiments (not shown), the locking surface can have a curved (e.g., concave or convex) profile when viewed in cross section, instead of a linear profile.

Figure 5A:
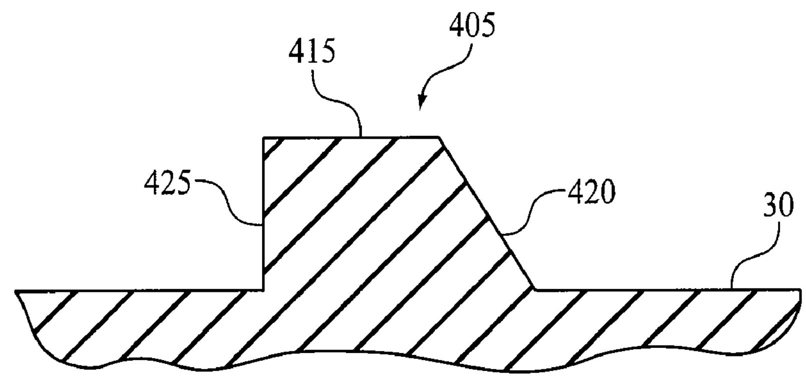
FIGS. 5A-5C illustrate cross-sectional views of exemplary rib profiles.
Figure 5B:
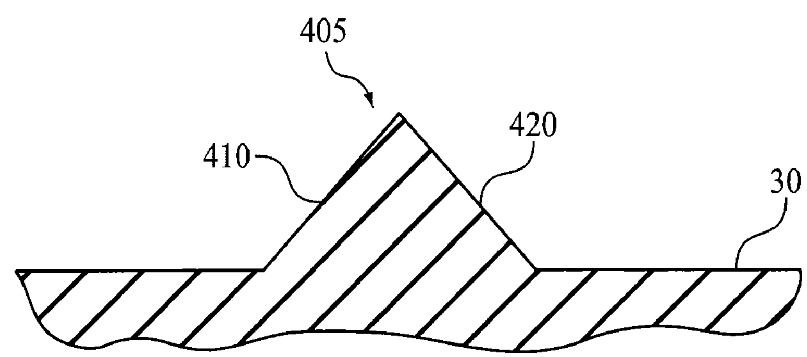
Figure 5C:
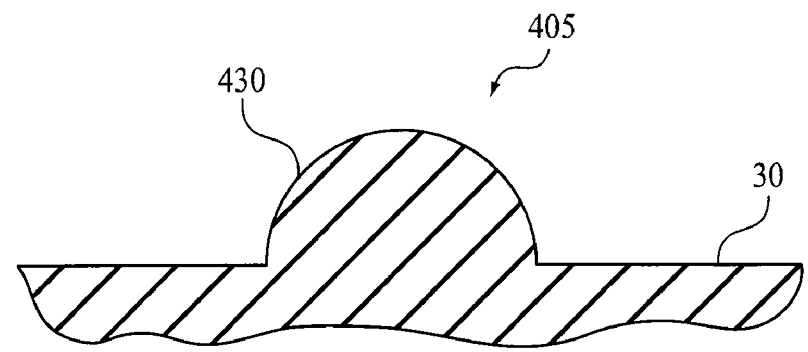

In alternative embodiments, the rib 405 may exhibit other profiles when viewed in cross-section. For example, the first chamfered surface 410 can be replaced by a radial surface 425 to form a different trapezoidal profile as shown in FIG. 5A. In another example, the first chamfered surface 410 may extend to a point where it engages the second chamfered surface 420 to form a generally triangular profile as shown in FIG. 5B. In yet another example, the rib 405 can be defined by a curved surface 430 that exhibits a generally semi-circular profile as shown in FIG. 5C. It will be appreciated that the rib profiles as shown in FIGS. 5A-5C are exemplary and in no way should be limited to such examples. Additionally, it will be appreciated that, when viewed in cross-section, the surfaces illustrated as being linear may be non-linear (e.g., curved) and the surfaces illustrated as being non-linear may be linear.

The coupling and uncoupling operations of the coupling assembly 400 are substantially similar to the coupling and uncoupling operations discussed above and illustrated in FIGS. 2A-2C and 3A-3C, respectively, with the exception that the second tapered surface 420 serves as one of the locking surfaces to which the second locking ring 68 is engaged. More specifically, when the coupling assembly 400 is in the coupled position (FIG. 4B), the second locking ring 68 is trapped between the second chamfered surface 420 (i.e., one of the locking surfaces) and the chamfered surface 84 (i.e., the other locking surface). In this position, the second locking ring 68 prevents the withdrawal of the first member 12 from the second member 14 by creating a positive lock between the second chamfered surface 420 of the first member 12 and the chamfered surface 84 of the second member 14.

Illustrated in FIG. 6 is a cross-sectional view of another embodiment of a coupling assembly 600 in the uncoupled position. The coupling assembly 600 is substantially similar to the coupling assembly 10 described above and illustrated in FIGS. 1A and 1B, with the exception that it includes a rib 605 that serves as the annular support element on the first member 12 (rather than a locking ring) and it includes a biasing element 610 configured to bias the locking sleeve 48 to its locked position.

In the illustrated embodiment, the rib 605 extends radially outward from the second outer surface 30 of the first member 12. The rib 605 includes a first chamfered surface 615 extending generally rearwardly and outwardly from the second outer surface 30, an outer cylindrical surface 620 extending rearward from the first chamfered surface 615, a second chamfered surface 625 extending generally rearwardly and inwardly from the outer surface 620, and a radial surface 630 that extends generally inward from the second tapered surface 625 to the second outer surface 30 of the first member 12. The second chamfered surface 625 serves as one of the locking surfaces configured to assist in locking the first and second members 12, 14 together, which will be discussed in more detail below. In alternative embodiments, the rib may exhibit other profiles when viewed in cross-section such as the ones illustrated in FIGS. 4A and 5A-5C. Additionally, in alternative embodiments (not shown), the locking surface can have a curved (e.g., concave or convex) profile when viewed in cross section, instead of a linear profile.

In the illustrated embodiment, the angle of the second chamfered surface 625 relative to the longitudinal axis A is about 45°. It will be appreciated that the angle of the second chamfered surface 625 relative to the longitudinal axis A of the first and second members 12, 14 can vary depending on the design.

As discussed above, the coupling assembly 600 includes a biasing element 610 configured to bias the locking sleeve 48 to its locked position. In the illustrated embodiment, the biasing element 610 is disposed about the first member 12 and positioned between the locking sleeve 48 and the collar 16. In the illustrated embodiment, the biasing element 610 is embodied as a coil spring wave washer (also known as a spring washer). In alternative embodiments, the biasing element 610 may take the form of an annular elastomeric member (e.g., an O-ring), a cylindrical rubber sleeve, or a coil spring wave washer (also known as a spring washer).

Figure 6A:
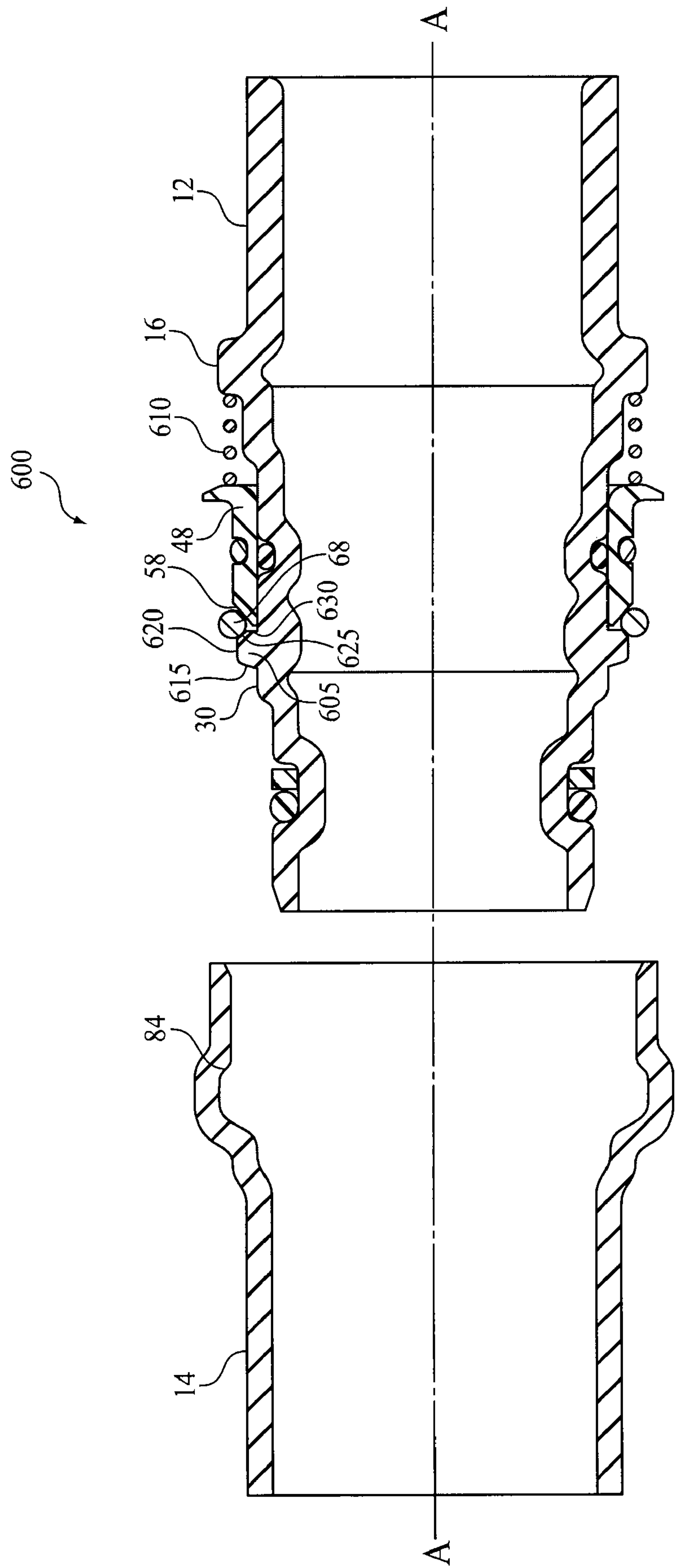
FIGS. 6A and 6B illustrate cross-sectional views of another embodiment of a coupling assembly 600 in the uncoupled and coupled positions, respectively.
Figure 6B:
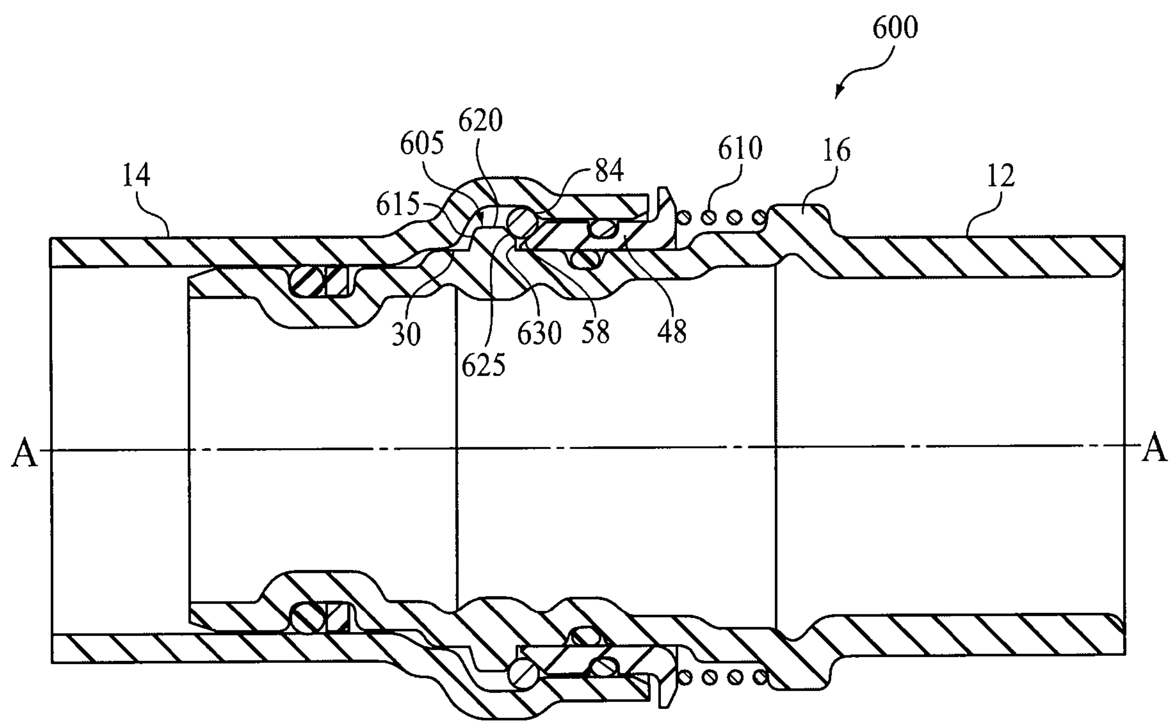

Due to the presence of the biasing element 610 that biases the locking sleeve 48 to its locked position, the locking ring 68 is in its expanded position when the coupling assembly 600 is in the uncoupled position (FIG. 6A). In this position, the locking ring 68 engages both the second chamfered surface 625 of the rib 605 and the beveled end surface 58 of the locking sleeve 48.

Figure 7A:
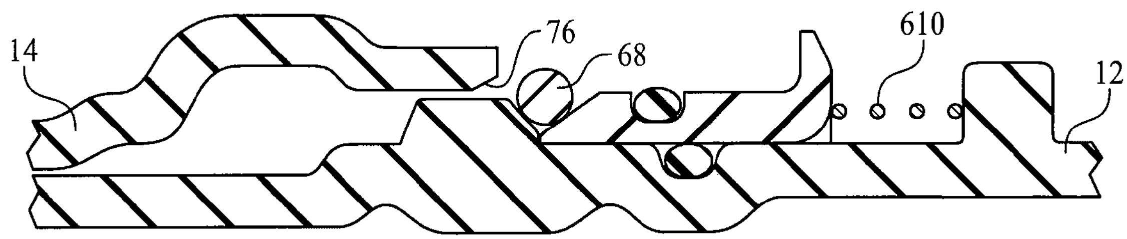
FIGS. 7A-7H illustrate cross-sectional views of a portion of the coupling assembly 600 at various stages during the coupling operation.
Figure 7B:
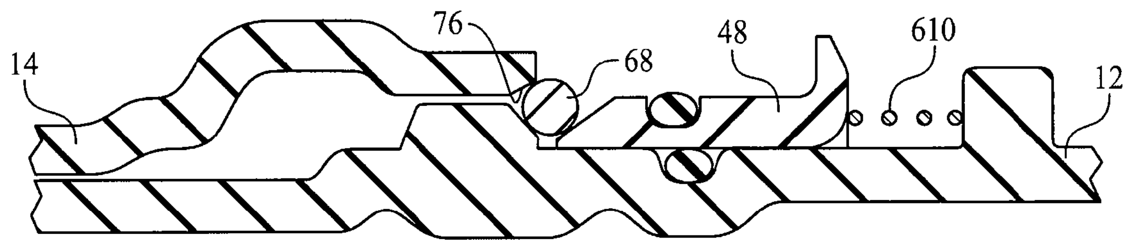

To couple the first and second members 12, 14 together, the first member 12 is inserted into the second member 14 (FIG. 7A) until the locking ring 68 engages the first chamfered surface 76 of the second member 14 (FIG. 7B). Upon continued forward movement of the first member 12, the first chamfered surface 76 of the second member 14 forces the second locking ring 68 to contract radially inward. It will be appreciated that since the locking ring 68 is in its expanded position, it will have a tendency to contract radially inward due to its resiliency.

Figure 7C:
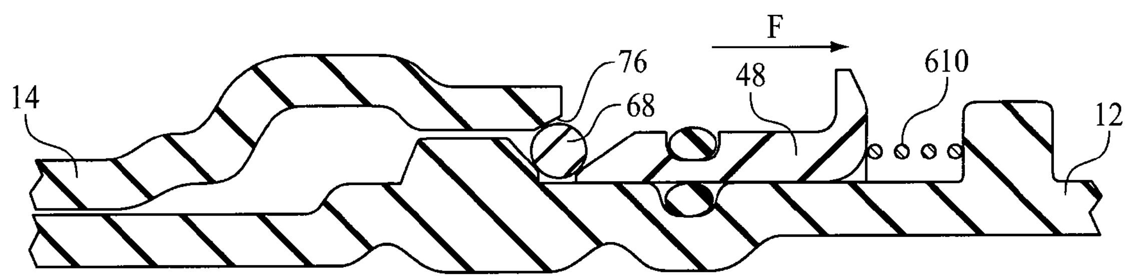
Figure 7D:
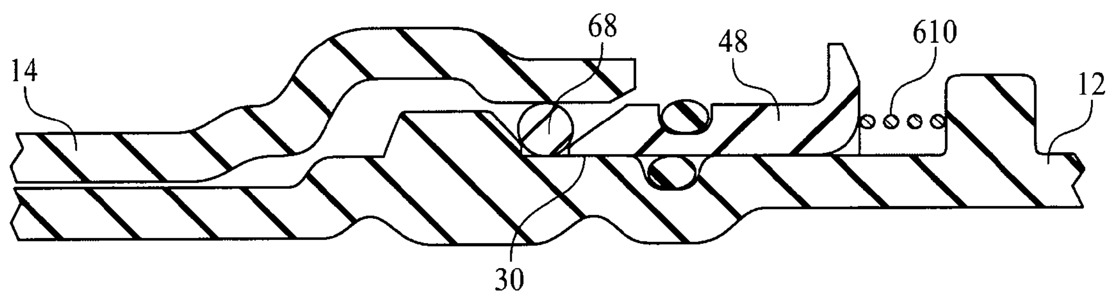

Due to its engagement with the locking ring 68, the locking sleeve 48 is forced to move rearward (in the direction of arrow F) against the urging of the biasing element 610 (FIG. 7B-7C). Consequently, the locking ring 68 contracts radially inward and simultaneously moves slightly rearward displacing the area previously occupied by the locking sleeve 48 (FIGS. 7B and 7C). Once the locking sleeve 48 reaches its unlocked position, the locking ring 68 returns to its contracted position where it engages the second inner surface 30 of the first member 12 (FIG. 7D).

Figure 7E:
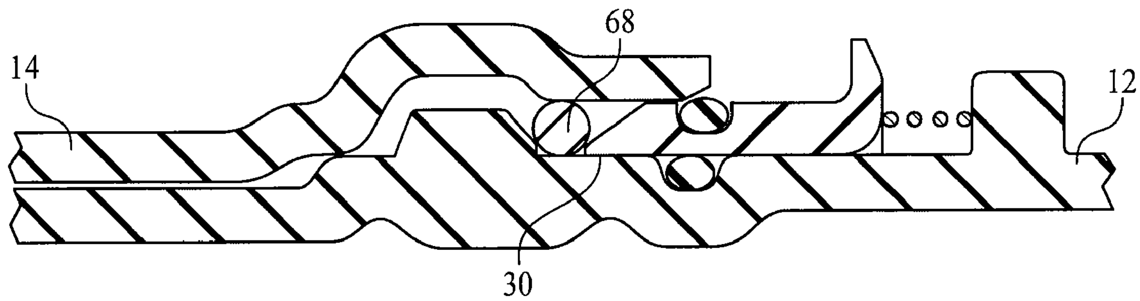
Figure 7F:
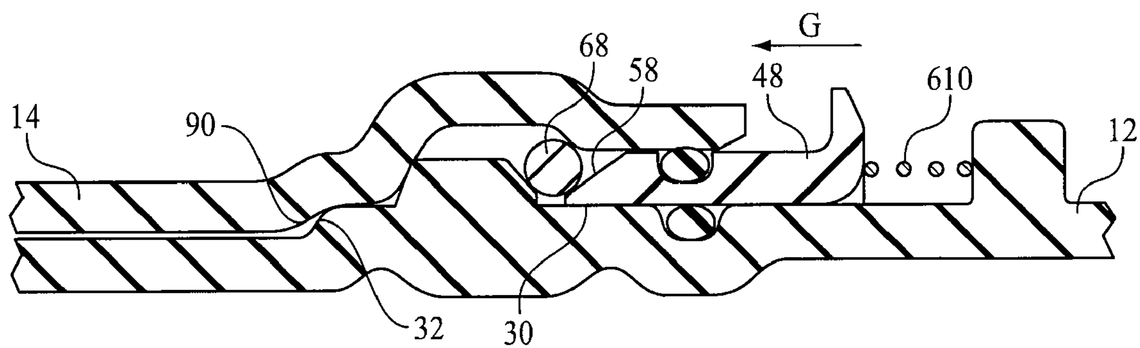
Figure 7G:
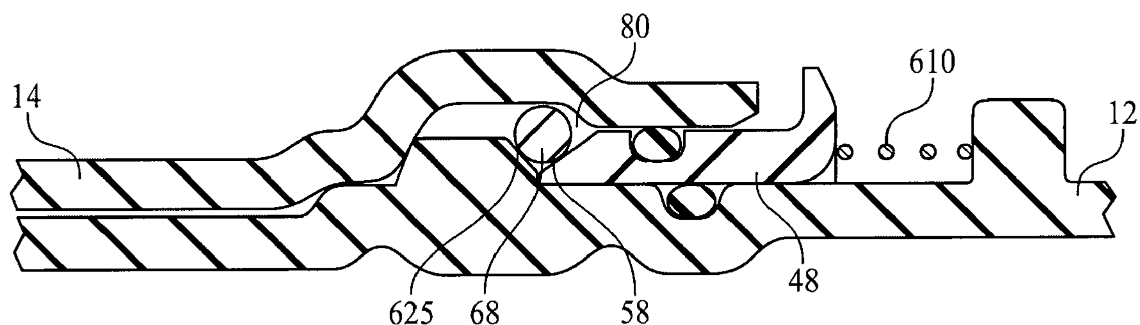

Upon further forward movement of the first member 12, the second locking ring 68 remains engaged with the second inner surface 30 (FIG. 7E) until the first shoulder 32 of the first member 12 abuts against the tapered surface 90 of the second member 14 (FIG. 7F). Once in this position, the first and second members 12, 14 can no longer move relative to each other in the axial direction. Due to the resiliency of the biasing element 610, the locking sleeve 48 springs forward (in the direction of arrow G) from its unlocked position until its beveled end surface 58 engages the locking ring 68 (FIG. 7F). Upon continued forward movement of the locking sleeve 48 to its locked position, the beveled end surface 58 of the locking sleeve 48 forces the locking ring 68, by virtue of it being split, to expand radially outward into the groove 80 while moving along the second chamfered surface 625 of the rib 605 (FIG. 7G).

Figure 7H:
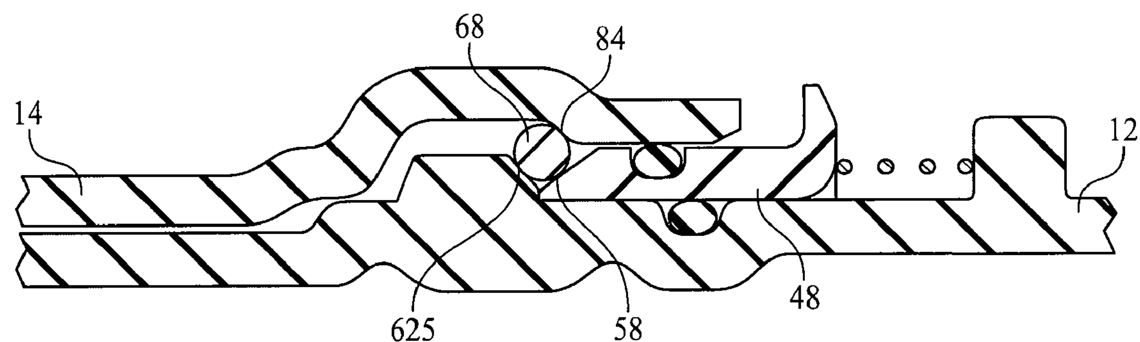

Upon pressurization of the coupling assembly 600 and/or rearward movement of the first member 12 relative to the second member 14 (or vice versa), the locking ring 68, in its expanded position, engages the chamfered surface 84, such that it is trapped between the second chamfered surface 625 of the rib 605 (i.e., one of the locking surfaces) and the chamfered surface 84 (i.e., the other locking surface) of the second member 14 (FIG. 7H). In this position, the locking ring 68 prevents the withdrawal of the first member 12 from the second member 14 by creating a positive lock between the first and second members 12, 14.

Figure 8A:
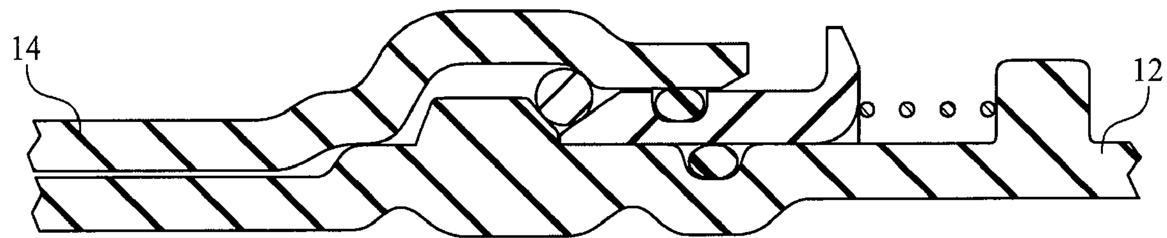
FIGS. 8A-8D illustrate cross-sectional views of a portion of the coupling assembly 600 at various stages during the uncoupling operation.
Figure 8B:
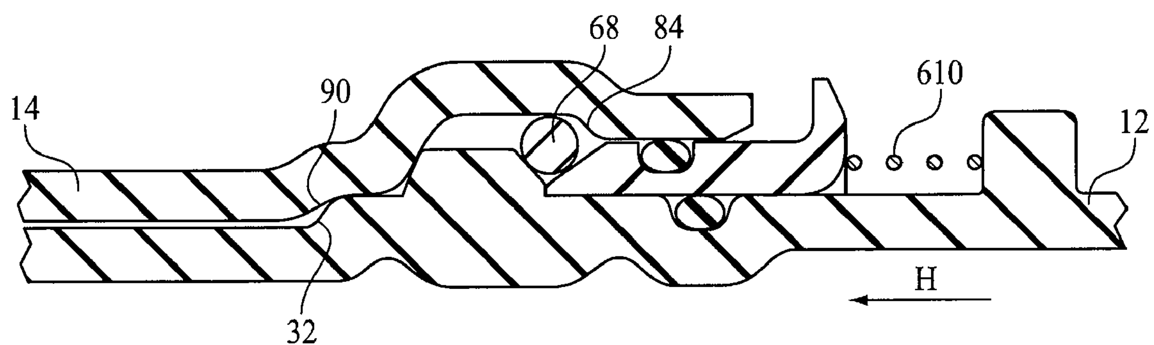
Figure 8C:
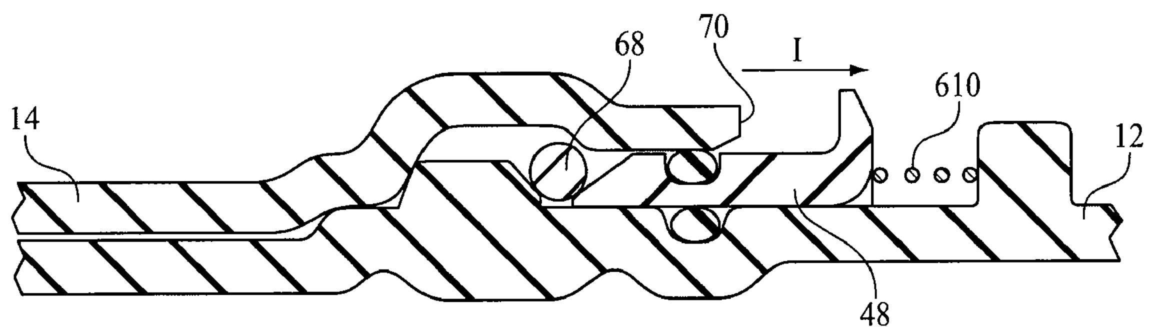

When it is desired to uncouple the first member 12 from the second member 14, the first member 12 is initially moved forward (in the direction of arrow H) relative to the second member 14 until the first shoulder 32 of the first member 12 abuts against the tapered surface 90 of the second member 14 (FIG. 8B). This forward movement of the first member 12 causes the locking ring 68 to be disengaged from the chamfered surface 84 (FIG. 8B). The locking sleeve 48 is then moved rearward (in the direction of arrow I), against the urging of the biasing element 610, to force the locking ring 68, by virtue of its resiliency, to simultaneously contract radially inward and move slightly rearward displacing the area previously occupied by the locking sleeve 48 (FIG. 8C). If desired, a tool may be inserted between the receiving end 70 of the second member 14 and the flange portion 56 of the locking sleeve 48 to assist in urging the locking sleeve 48 rearwardly.

Figure 8D:
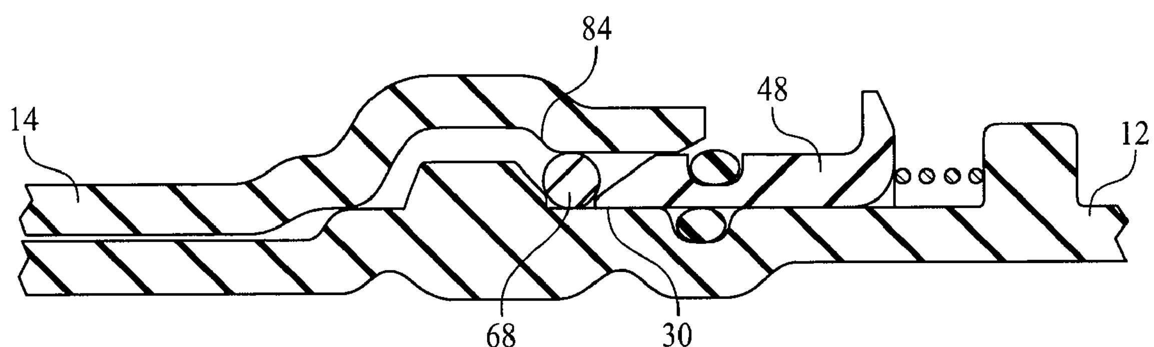

Once the locking sleeve 48 reaches its unlocked position, the locking ring 68 returns to its contracted position where it engages the second outer surface 30 of the first member 12 (FIG. 8D). Once in engagement with the second outer surface 30, the locking ring 68 will no longer interfere with the chamfered surface 84. This will allow the first member 12 to be disconnected from the second member 14, resulting in the coupling assembly 600 being in the uncoupled position (FIG. 6A).

Figure 9A:
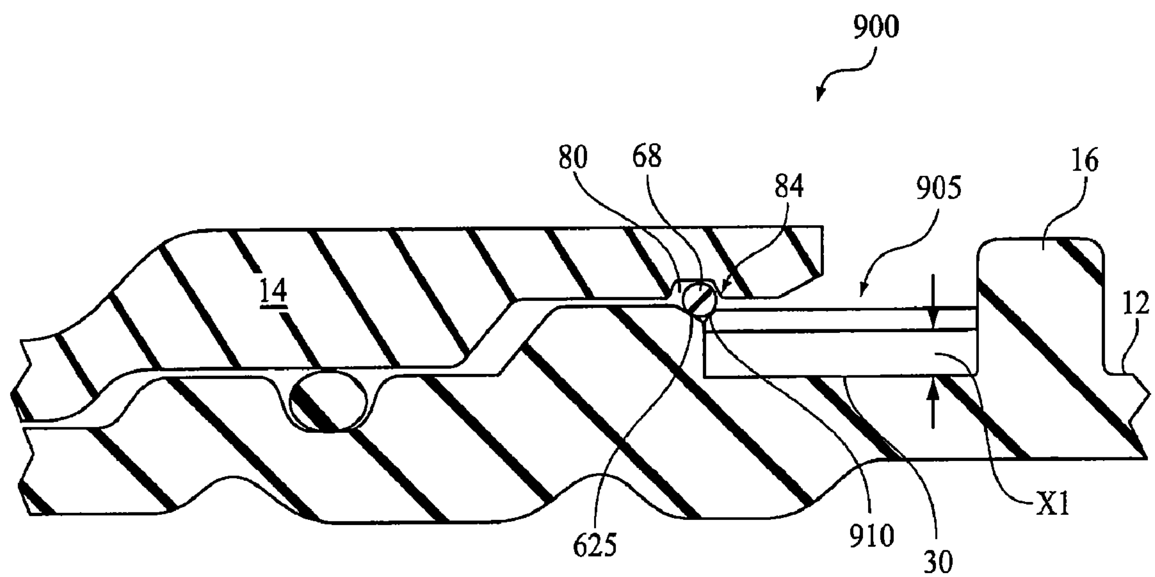
FIGS. 9A and 9B illustrates cross-sectional views of another embodiment of a coupling assembly 900 in the coupled and uncoupled positions, respectively.
Figure 9B:
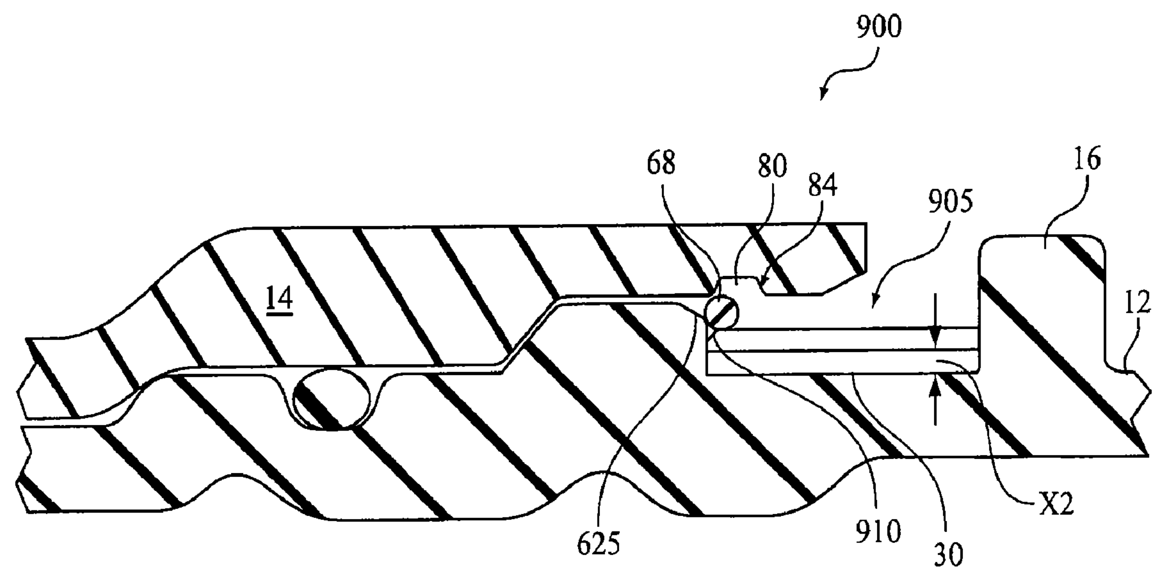

Illustrated in FIGS. 9A and 9B are cross-sectional views of another embodiment of a coupling assembly 900 in the coupled and uncoupled positions, respectively. The coupling assembly 900 is similar to the coupling assembly 600 described above and illustrated in FIGS. 6A and 6B above, with the exception that a sleeve spring 905 replaces the locking sleeve 48 and the biasing element 610.

The sleeve spring 905 is a split, cylindrical member that is constructed of a resilient material (e.g., spring steel) positioned between the collar 16 and the locking ring 68. At its forward end, the sleeve spring 905 has a chamfered surface 910 that extends forward and towards the longitudinal axis A of the first and second members 12, 14. In the illustrated embodiment, the angle of the chamfered surface 910 is about 45° relative to the longitudinal axis A of the first and second members 12, 14. It will be appreciated that the angle of the chamfered surface 910 relative to the longitudinal axis A of the first and second members 12, 14 can vary depending on the design.

By virtue of being split, the sleeve spring 905 is movable between expanded and collapsed positions. In the expanded position, as shown in FIG. 9A, the outer diameter of the sleeve spring 905 is sufficiently sized to bias the locking ring 68 to its expanded position, where it is in engagement with the second chamfered surface 625 of the rib 605 and the chamfered surface 910 of the sleeve spring 905. When in its expanded position, the sleeve spring 905 is spaced from the second outer surface 30 a distance X1.

When opposing radial forces (or similar directional forces) are applied to it, the sleeve spring 905 is capable of collapsing radially inward to its collapsed position, such that the sleeve spring 905 is spaced from the second outer surface 30 a distance X2, which is less than X1, as shown in FIG. 9B. Due to the collapsing of the sleeve spring 905, the locking ring 68 falls out of engagement with the second chamfered surface 625 of the rib 605. Also, by virtue of being resilient, the sleeve spring 905 is capable of expanding radially outward to return to its expanded position.

When the coupling assembly 900 is in its coupled position, the sleeve spring 905 is in its expanded position, thereby biasing the locking ring 68 is to its expanded position. In this position, the locking ring 68 engages both the second chamfered surface 625 of the rib 605 and the chamfered surface 910 of the sleeve spring 905 as shown in FIG. 9A.

The coupling and uncoupling operations of the coupling assembly 900 is similar to the coupling and uncoupling operations discussed above and illustrated in FIGS. 7A-7H and 8A-8D, respectively, with the exception that the sleeve spring 905 is forced to collapse radially inward to its collapsed position by the contracting locking ring 68 (as opposed to the locking sleeve 48 in the coupling assembly 600 being forced to move axially rearward), when the first member 12 is inserted into the second member 14. However, due to its resiliency, the sleeve spring 905 is capable of returning to its expanded position to force the locking ring 68 to expand radially outward into the groove 80, thereby locking the first and second members 12, 14 together.

To disconnect the first and second members 12, 14 from each other, opposing radial forces (or similar directional forces) can be applied to the sleeve spring 905 (preferably with the assistance of a tool) to force the sleeve spring 905 to collapse to its collapsed position and to simultaneously permit the locking ring 68 to contract out of the groove 80. Once positioned out of the groove 80, the locking ring 68 will no longer interfere with the chamfered surface 84. This will allow the first member 12 to be disconnected from the second member 14, resulting in the coupling assembly 900 being in the uncoupled position (FIG. 9B).

For all of the coupling assemblies discussed above, it will be appreciated that the angles and profiles of the various components, when viewed in cross-section, can vary depending on the design, so long as there is sufficient interference between the locking element (e.g., the split locking ring) and the two locking surfaces to lock the first and second members together. Specifically, the cross-section of the locking element, the cross-section of the support element, the angle of the chamfered surface on the groove that accepts the locking element, and the angle of the beveled end surface of the locking sleeve all contribute towards the trapping of the locking element between the two locking surfaces. For example, by changing the angle or cross-section of one of the foregoing components, the angle and/or cross-section of one or more of the other components may be changed to provide the proper engagement between the relevant components.

Moreover, for all of the embodiments discussed above, it will be appreciated that one or more of the cylindrical surfaces discussed above may be replaced with a surface having a linear profile that is angled relative to the longitudinal axis A of the first and second members 12, 14 (e.g., conical surfaces) or curved surfaces (e.g., convex or concave surfaces).

Figure 10A:
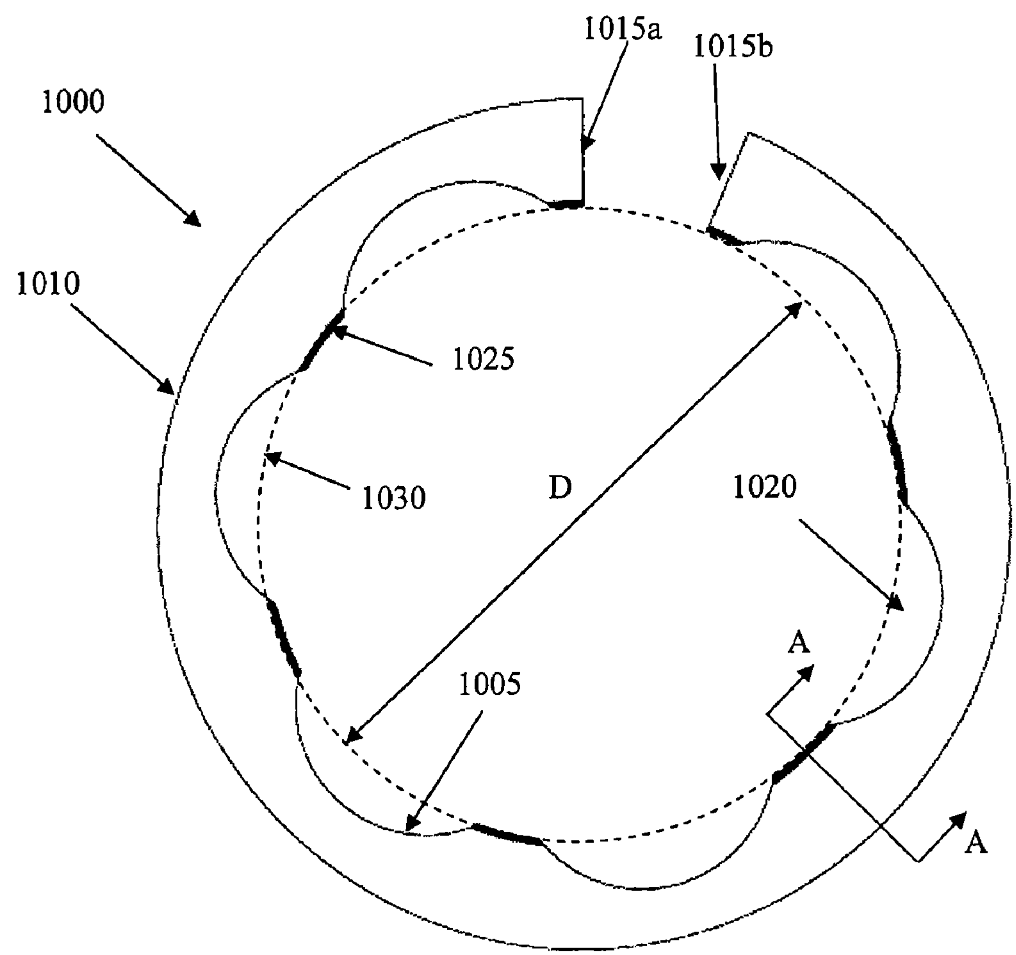
FIGS. 10A and 10B illustrate top plan and cross-sectional views, respectively, of one embodiment of a retaining clip 1000 for use with an axially displaceable coupling assembly to maintain the coupling assembly in a coupled position and/or prevent involuntary disconnection of the coupling assembly.
Figure 10B:
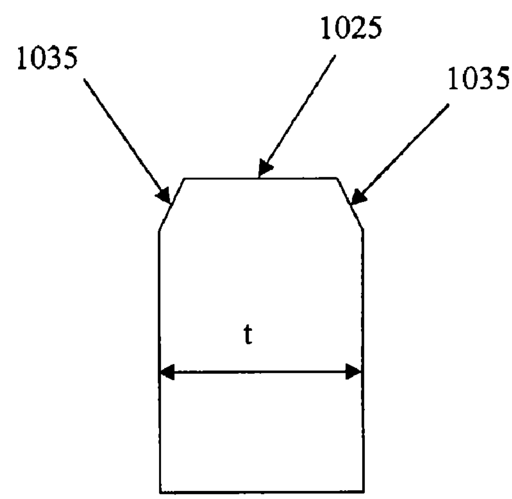

Illustrated in FIGS. 10A and 10B are top plan and cross-sectional views, respectively, of one embodiment of a retaining clip 1000 for use with an axially displaceable coupling assembly, such as the coupling assemblies 10, 400 described above, to maintain the coupling assembly in the connected position and/or prevent involuntary disconnection of the coupling assembly. For convenience, the retaining clip 1000 will be discussed herein with reference to the coupling assembly 10 as shown in FIGS. 1A and 1B and described above.

In the illustrated embodiment, the retaining clip 1000 is a split, resilient annular member having an inside surface 1005, outer surface 1010, and first and second spaced-apart ends 1015*a,b*. In the illustrated embodiment, the space between the first and second ends 1015*a,b* is relatively small, requiring the retaining clip 1000 to be installed onto the outer surface of the collar 16 prior to assembly of most of the other components of the first member 12. In an alternative embodiment (not shown), the space between the first and second ends 1015*a,b* 1000 can be larger permitting the retaining clip 1000 to be installed directly onto the outer surface of the collar 16 after assembly of the other components of the first member 12.

The inner surface 1005 includes a plurality of circumferentially spaced-apart recesses 1020 that define tabs 1025 therebetween. The tabs 1025 define an opening 1030 having an inner diameter D that is measured from one tab 1025 to an opposing tab 1025 and sized to snugly engage the third outer surface 34 of the first member 12. As shown in FIG. 10B, the retaining clip 1000 has a thickness t that is sufficiently sized to prevent rearward axial movement of the locking sleeve 48 to its unlocked position, when the retaining clip 1000 is positioned within the groove formed between the locking sleeve 48 (when in its locked position) and the collar 16. To facilitate easier installation and removal of the retaining clip 1000, each tab 1025 includes chamfered surfaces 1035.

In the illustrated embodiment, although the retaining clip 1000 has a generally rectangular cross-section, it will be appreciated that the retaining clip 1000 can have a different cross-section such as circular, triangular, trapezoidal, or square. In one embodiment, the retaining clip 1000 can be formed of a polymeric material. In alternative embodiments, the retaining clip 1000 can be formed of other metals such as a spring tempered phosphoric bronze material, carbon steel, or stainless spring steel.

By virtue of being split, the retaining clip 1000 is movable between a contracted position (FIG. 10A) and an expanded position (not shown), where the inner diameter D of the opening 1030 is increased to a size that permits the tabs 1025 to snugly engage the outer surface of the collar 16. Although not illustrated in the figures, it may be necessary to provide a radial shoulder rearward of the collar 16 to serve as a stop to prevent axial movement of the retaining clip 1000 towards the trailing portion 22 of the first member 12. By virtue of being resilient, the retaining clip 1000 is capable of contracting radially inward to return to its contracted position.

To use the retaining clip 1000 with an axially displaceable coupling assembly, such as the coupling assembly 10 described above, the retaining clip 1000 is first moved to its expanded position and installed onto the outer surface of the collar 16. The retaining clip 1000, after it has been moved to its expanded position, is installed onto the outer surface of the collar 16 prior to assembly of most of the other components of the first member 12 (e.g., prior to installation of the locking sleeve 48 and the first and second locking rings 46, 68) to eliminate the need to further expand the retaining clip 1000 over these components. In the embodiment where the space between the first and second ends 1015*a,b* is larger, the retaining clip 1000 can be installed directly onto the outer surface of the collar 16 after assembly of the other components of the first member 12.

Once installed onto the outer surface of the collar 16 and after the locking sleeve 48 has been moved to its locked position to connect the first and second members 12, 14 together, the retaining clip 1000 is then moved axially forward until it moves to its contracted position due to its resiliency. After moving to its contracted position, the retaining clip 1000 is received within the groove between the locking sleeve 48 and the collar 16, and its tabs 1025 engage the third outer surface 34 of the first member 12 (FIG. 1B). In this position, the retaining clip 1000 maintains the coupling assembly 100 in the connected position, thereby preventing involuntary rearward axial movement of the locking sleeve 48. Optionally, the retaining clip 1000 can be configured to also move the locking sleeve 48 forward to its locked position when it is being moved axially forward.

To permit disconnection of the coupling assembly 10, the retaining clip 1000, with the assistance of a tool, is moved to its expanded position and then moved axially rearward until its tabs 1025 engage the outer surface of the collar 16. In this position, the locking sleeve 48 can be moved to its unlocked position and the coupling assembly 10 can be disconnected.

Figure 11A:
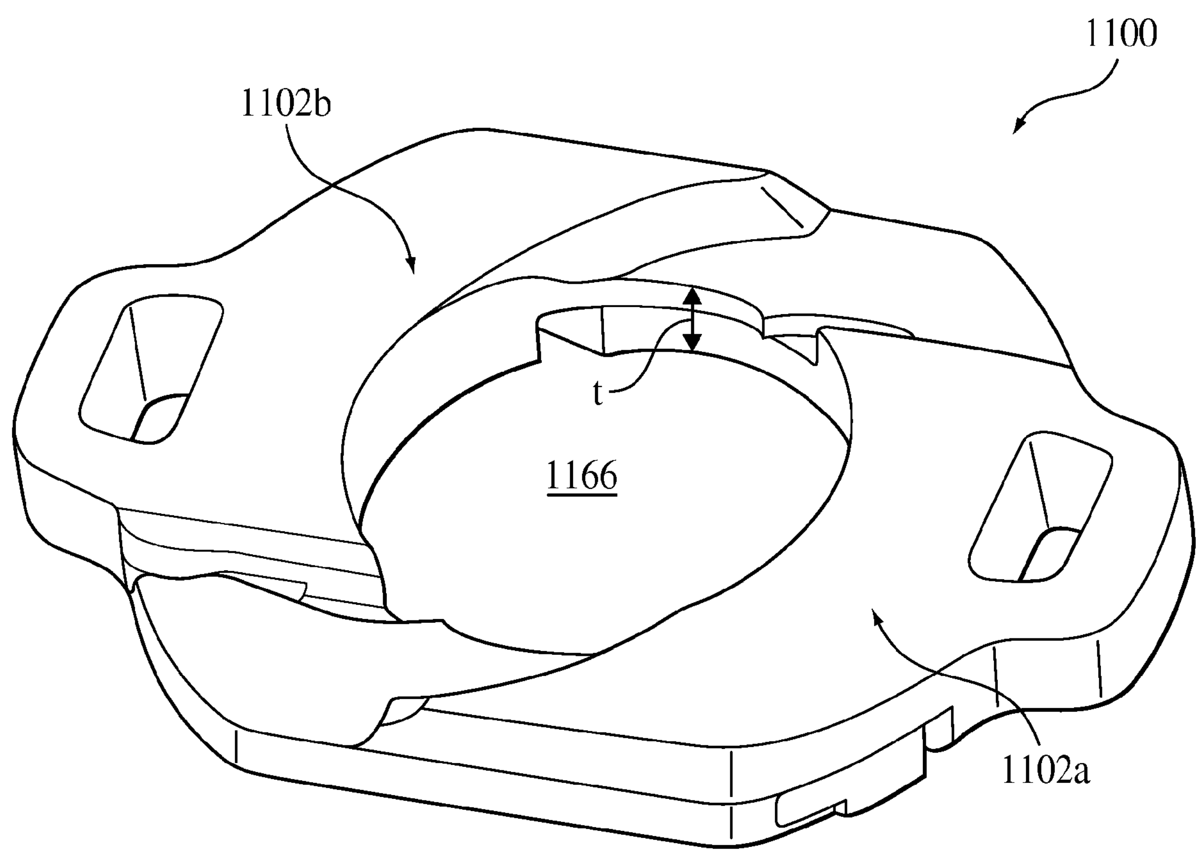
FIG. 11A illustrates a perspective view of one embodiment of a retainer 1100 in an assembled state for use with an axially displaceable coupling assembly to maintain the coupling assembly in a coupled position and/or prevent involuntary disconnection of the coupling assembly.

Illustrated in FIG. 11A is a perspective view of one embodiment of a retainer 1100 in an assembled state for use with an axially displaceable coupling assembly, such as the coupling assemblies 100, 400 described above, to maintain the coupling assembly in the connected position and/or prevent involuntary disconnection of the coupling assembly. The retainer 1100 includes first and second U-shaped members 1102*a,b* axially movable with respect to each other between locked and unlocked positions, which will be discussed in more detail below. For convenience, the retainer 1100 will be discussed herein with reference to the coupling assembly 100 as shown in FIGS. 1A and 1B and described above.

In the illustrated embodiment, the first and second U-shaped members 1102*a,b* are identical components that are configured to mate with each other when one U-shaped member is oriented 180 degrees relative to the other and moved towards each other. In another embodiment (not shown), the U-shaped members are different from each other in structure, but are still configured to mate with each other when the U-shaped members are moved towards each other. In one embodiment, the first and second U-shaped members 1102*a,b* are constructed of a polymeric material. In other embodiments, the first and second U-shaped members 1102*a,b* can be constructed of aluminum or a zinc alloy.

Figure 11B:
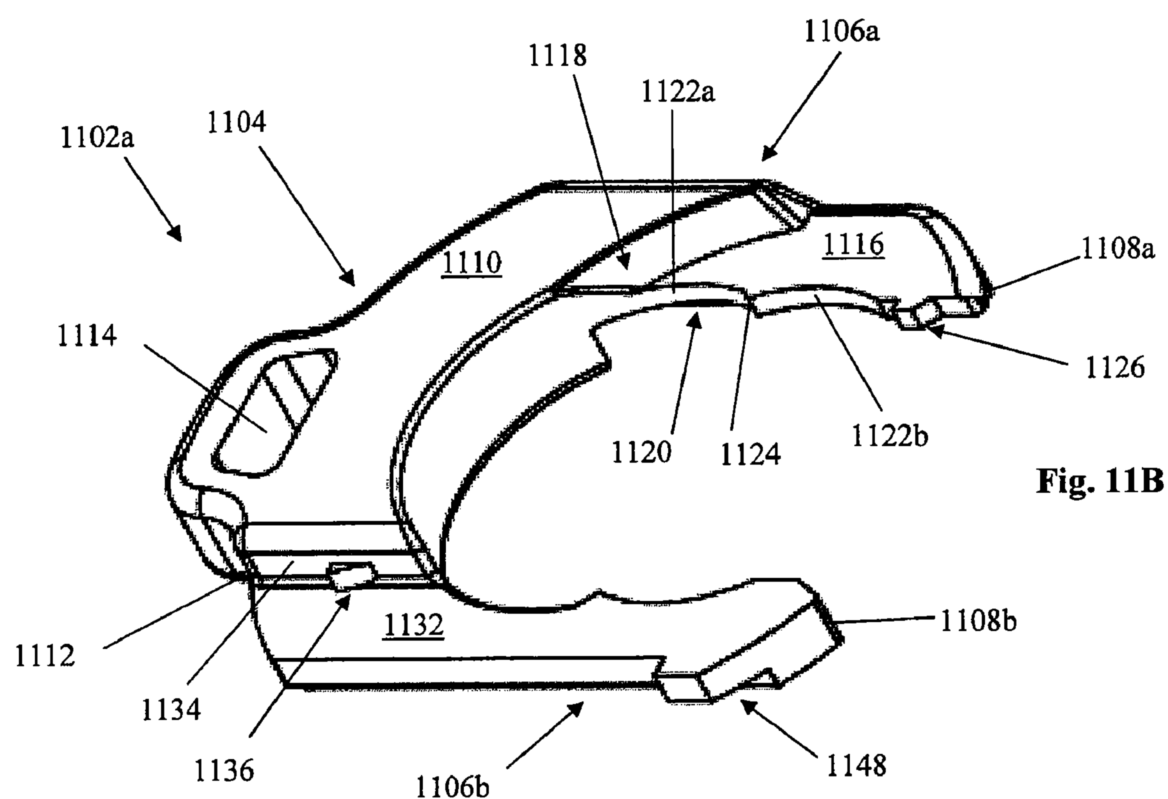
FIGS. 11B and 11C illustrate perspective and top plan views, respectively, of one of the U-shaped members 1102 of the retainer 1100.
Figure 11C:
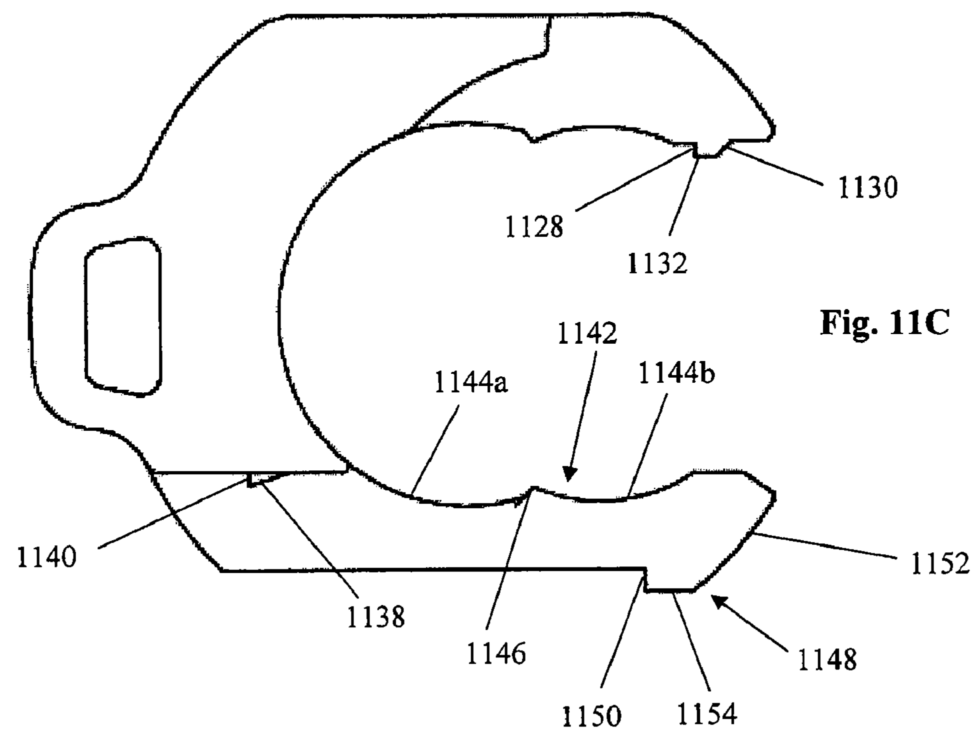

Illustrated in FIGS. 11B and 11C are perspective and top plan views, respectively, of one of the U-shaped members 1102 of the retainer 1100. For simplicity, the U-shaped member 1102 will be discussed herein with reference to the first U-shaped member 1102*a*. It will be appreciated that since the first and second U-shaped members 1102*a,b* are identical in structure in the illustrated embodiment, the second U-shaped member 1102*b* will have the same structure.

As shown in FIGS. 11B and 11C, the U-shaped member 1102*a* includes a base portion 1104 and first and second spaced-apart arms 1106*a,b* that extend from the base portion 1104 and terminate at first and second ends 1108*a,b*, respectively. The base portion 1104 includes a top surface 1110, a bottom surface 1112, and an aperture 1114 extending therebetween for receiving a screwdriver tip or other tool.

In the illustrated embodiment, the first arm 1106*a* includes a top surface 1116 and a sloped surface 1118 that separates the top surface 1116 from the top surface 1110 of the base portion 1104. The sloped surface 1118 slopes downward towards the first end 1108*a* of the first arm 1106*a*, such that it gradually decreases in thickness in a direction towards the first end 1108*a*. The first arm 1106*a* also includes an inner edge 1120 having two arcuate sections 1122*a,b* that meet at an edge 1124 and a protruding catch element or tab 1126 adjacent to the first end 1108*a* of the first arm 1106*a* that extends inward towards the second arm 1106*b*. The catch tab 1126 is defined by a shoulder 1128, a ramp 1130, and an edge 1132 separating the shoulder 1128 from the ramp 1130.

The second arm 1106*b* includes a top surface 1132 and a shoulder 1134 that separates the top surface 1132 from the top surface 1112 of the base portion 1104. Extending outward from the shoulder 1134 is a protruding catch element or tab 1136 that is defined by a ramp 1138 and a ledge 1140 configured to engage the catch tab 1126 of the first arm 1102*a* of the second U-shaped member 1102*b*. The second arm 1106*b* also includes an inner edge 1142 having two arcuate sections 1144*a,b* that meet at an edge 1146. Extending outward from the second end 1108*b* of the second arm 1106*b* is a protruding catch element or tab 1148 having an L-shaped cross-section. The catch tab 1148 is defined by a shoulder 1150, a ramp 1152, and an edge 1154 separating the shoulder 1150 from the ramp 1152.

Figure 11D:
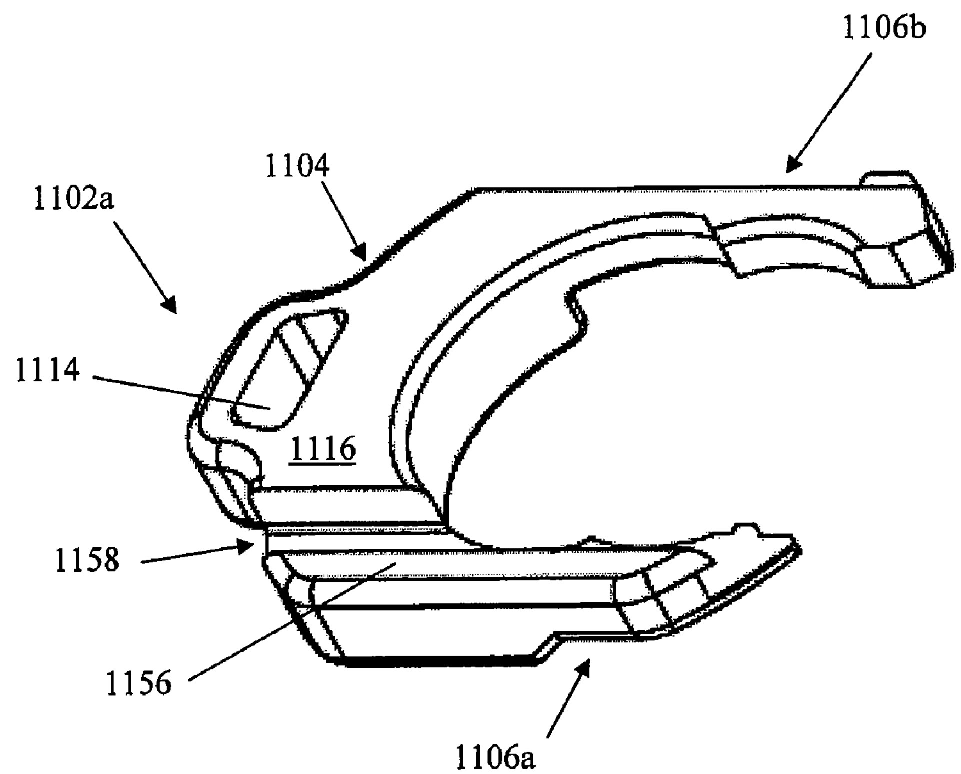
FIGS. 11D and 11E illustrate perspective views of the bottom of the U-shaped member 1102*a*.
Figure 11E:
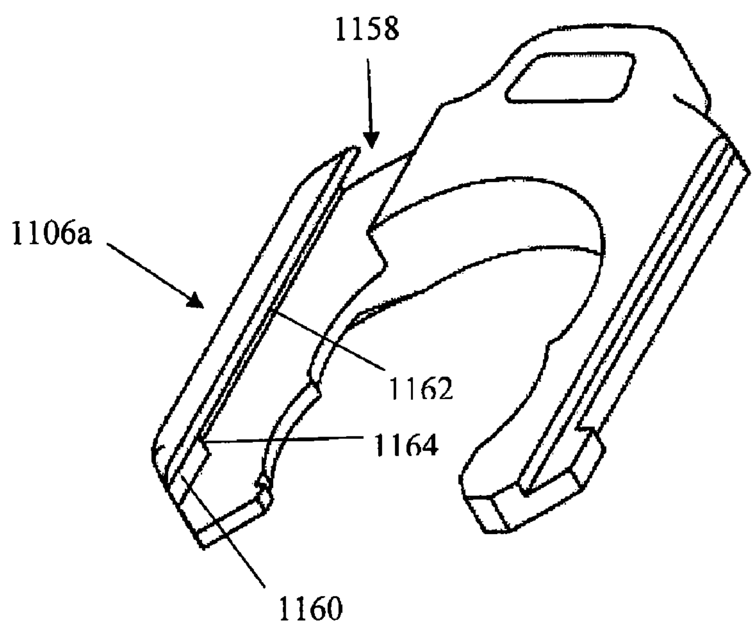

Illustrated in FIGS. 11D-11E are perspective views of the bottom of the U-shaped member 1102*a*. As shown in FIGS. 11D-11E, the first arm 1106*a* includes a bottom surface 1156 that is separated from the bottom surface 1116 of the base portion 1104 by a groove 1158. The groove 1158 is defined by a first inner surface 1160, a second inner surface 1162, and a catch ledge 1164 separating the first and second inner surfaces 1160, 1162 from each other. The catch ledge 1164 is configured to engage the shoulder 1150 of the catch tab 1148 on the second arm 1106*b* of the second U-shaped member 1102*b*.

In the illustrated embodiment, the groove 1158 in the first arm 1106*a* has an L-shaped cross-section that is configured to receive the catch tab 1148 of the second arm 1106*b* of the second U-shaped member 1102*b* and permit sliding engagement between the first and second arms 1106 of respective U-shaped members 1102, such that the first and second U-shaped members 1102*a,b* are movable between unlocked and locked positions, which will be discussed in more detail below. Although the groove 1158 in the illustrated embodiment has an L-shaped cross-section, it will be appreciated that the groove 1158 can take the form of a variety of cross-sections in alternative embodiments (not shown), so long as the cross-section of the groove 1158 permits sliding engagement between the first and second U-shaped members 1102*a, b*.

With reference back to FIG. 11A, when in sliding engagement with each other, the first and second U-shaped members 1102*a,b* define an opening 1166 between the slidingly engaged arms 1106 that is sized to receive the third outer surface 34 of the first member 12. Since the first and second U-shaped members 1102*a,b* are axially movable with respect to each other, the size of the opening 1166 changes when the first and second U-shaped members 1102*a,b* are moved relative to each other. For example, when the first and second U-shaped members 1102*a,b* are moved towards each other, the size of the opening decreases. Conversely, when the first and second U-shaped members 1102*a,b* are moved away from each other, the size of the opening increases.

Figure 11F:
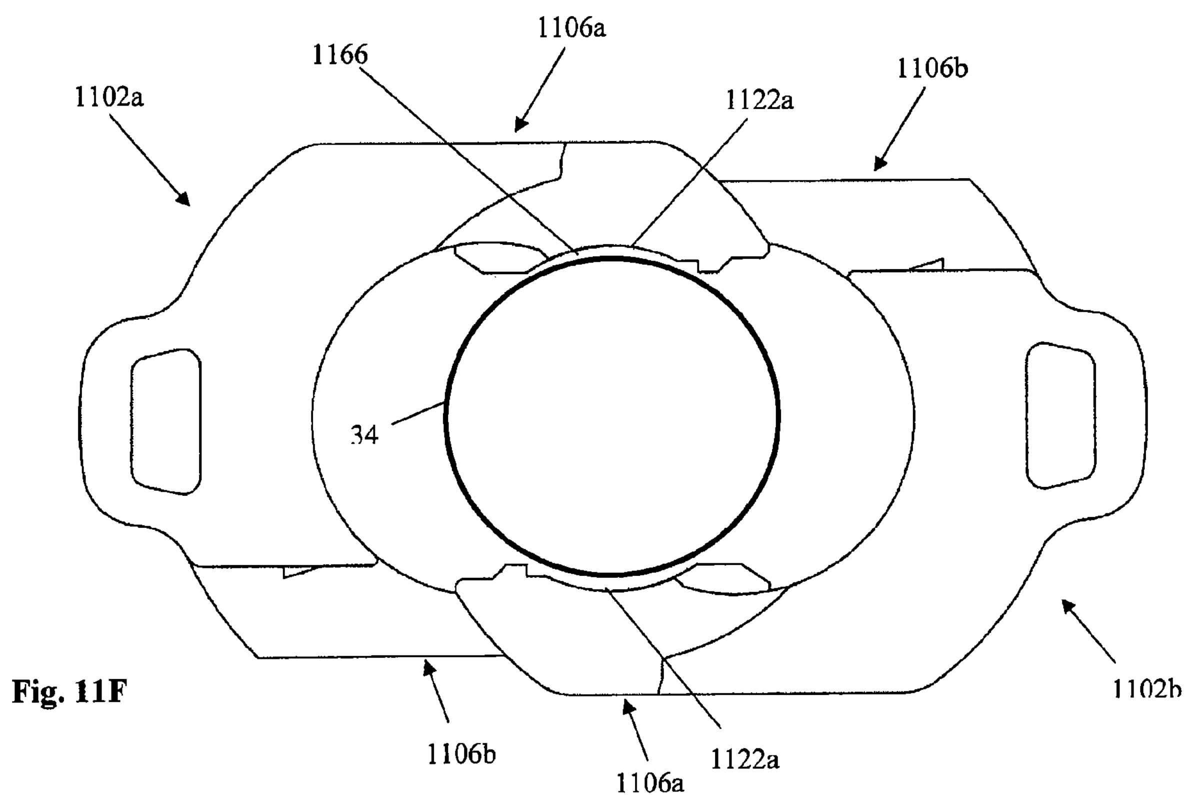
FIGS. 11F and 11G illustrate top plan views of the retainer 1100 in the unlocked and locked positions, respectively.

When in their unlocked position, the first and second U-shaped members 1102*a,b* are positioned as shown in FIG. 11F, where the catch tab 1148 (not shown) of each second arm 1106*b* of a respective U-shaped member 1102 has been moved past the catch ledge 1164 (not shown) of each groove 1158 (not shown) of a respective U-shaped member 1102 and the second arcuate sections 1122*b*, 1144*b* (not shown) of respective arms 1106 are aligned with each other. When the first and second U-shaped members 1102*a,b* are in the unlocked position, the portion of the opening 1166 adjacent the second arcuate sections 1122*b*, 1144*b* of respective arms 1106 is configured to receive the third outer surface 34 of the first member 12 as shown in FIG. 11F. Additionally, when the first and second U-shaped members 1102*a,b* are in the unlocked position, the portion of the retainer 1100 that is adjacent to the portion of the opening 1166 that receives the third outer surface 34 of the first member 12 has a thickness that is less than the width of the groove between the locking sleeve 48 and the collar 16, thereby permitting movement of the locking sleeve 48 to its unlocked position.

Figure 11G:
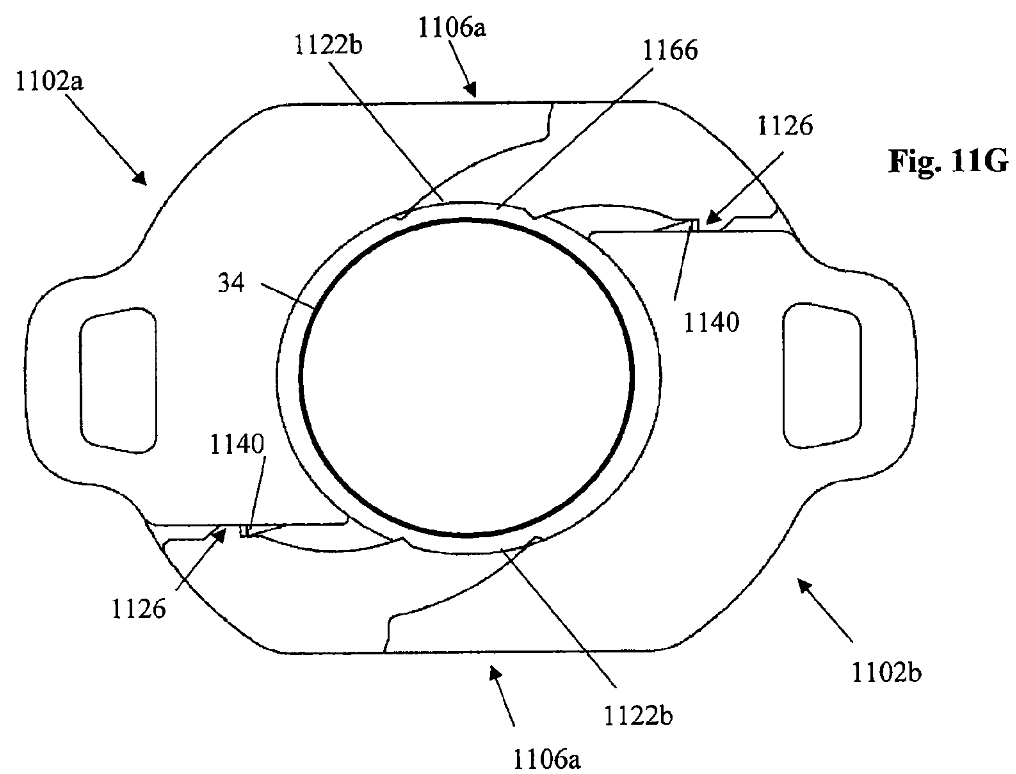

When in their locked position, the first and second U-shaped members 1102*a,b* are positioned as shown in FIG. 11G, where the catch tab 1126 of each first arm 1106*a* of a respective U-shaped member 1102 has been axially moved past the shelf 1140 on each second arm 1106*b* of a respective U-shaped member 1102. Each shelf 1140 serves as a stop to prevent involuntary axial movement of the first and second U-shaped members 1102*a,b* to the unlocked position. When the first and second U-shaped members 1102*a,b* are in the locked position, the portion of the opening 1166 adjacent the first arcuate sections 1122*b*, 1144*b* (not shown) of respective arms 1106 is configured to receive the third outer surface 34 of the first member 12 as shown in FIG. 11G. Additionally, when in this position, the thickness t (see FIG. 11A) of the portion of the retainer 1100 adjacent to the portion of the opening 1166 that receives the third outer surface 34 of the first member 12 is increased to a size that is substantially equal to the width of the groove between the locking sleeve 48 and the collar 16, due to the sloped surface 1118 of the first arms 1106*a*. Because of this increased thickness, the retainer 1100 maintains the locking sleeve 48 in its locked position, thereby preventing involuntary movement of the locking sleeve 48 to its unlocked position.

Figure 11H:
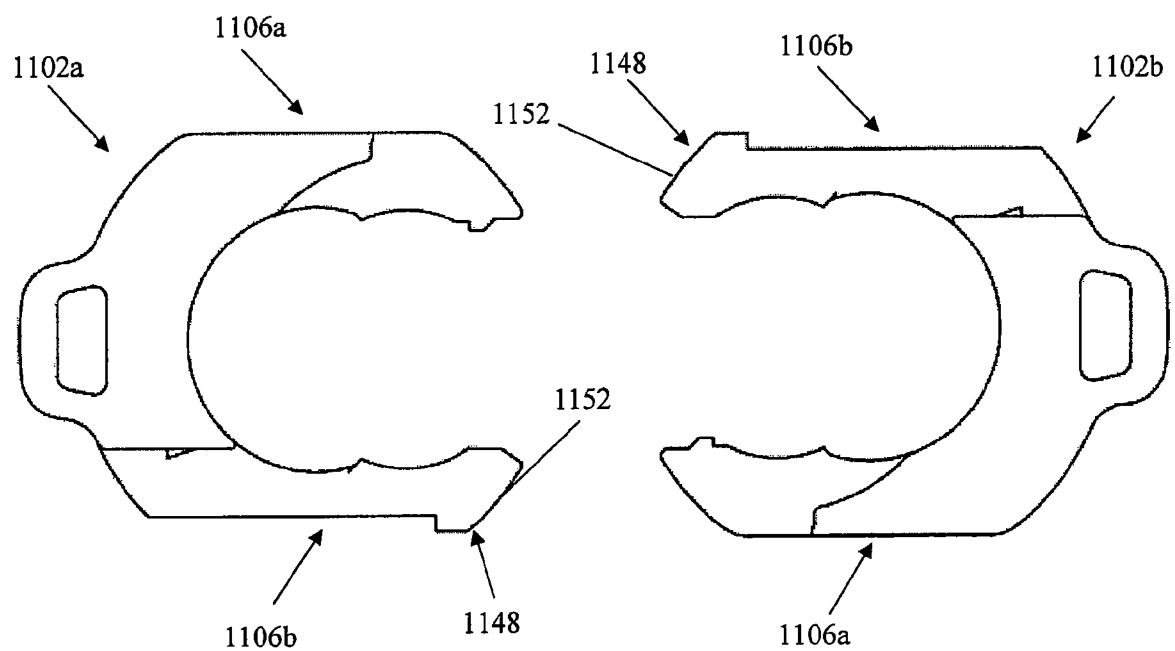
FIG. 11H illustrates a top plan view of the retainer 1100 in an unassembled state.

To assemble the retainer 1100, the first U-shaped member 1102*a* is initially rotated 180° relative to the second U-shaped member 1102*b* (or vice versa) until the catch tab 1148 of each second arm 1106*b* of a respective U-shaped member 1102 is aligned with the groove 1158 (not shown) in each first arm 1106*a* of a respective U-shaped member 1102 (FIG. 11H). Once in alignment, the first and second U-shaped members 1102*a,b* are axially moved towards each other until the ramp 1152 of each catch tab 1148 engages the second inner surface 1162 of each groove 1158. Upon continued axial movement, the second inner surface 1162 of each groove 1158 interacts with the ramp 1152 of each catch tab 1148 and forces each second arm 1106*b* to deflect inward and cam along the second inner surface 1162, until the catch tab 1148 of each second arm 1106*b* snaps behind the catch ledge 1164 of each groove 1158. Once assembled, each catch ledge 1164 serves as a stop to prevent involuntary disconnection of the first U-shaped member 1102*a* from the second U-shaped member 1102*b*.

To use the retainer 1100 with an axially displaceable coupling assembly, such as the coupling assembly 10 described above, the retainer 1100 is first assembled in the manner as described above. Once assembled, the retainer 1100 is moved to its unlocked position and then installed onto the third outer surface 34 of the first member 12 (FIG. 11F) prior to assembly of most of the other components of the first member 12 (e.g., prior to installation of the locking sleeve 48 and the first and second locking rings 46, 68). Alternatively, the first and second U-shaped members 1102*a,b* can be assembled directly onto the third outer surface 34 of the first member 12 (FIG. 11F) after assembly of the other components of the first member 12.

After the locking sleeve 48 has been moved to its locked position to lock the first and second members 12, 14 together, the first and second U-shaped members 1102*a,b* are moved towards each other until the ramp 1130 of each catch tab 1126 engages the ramp 1138 of each catch tab 1136. Upon continued movement of the first and second members 12, 14 towards each other, the ramp 1138 of each catch tab 1136 interacts with the ramp 1130 of each catch tab 1126 and forces each first arm 1106*a* to deflect outward and cam along the ramp 1138, until the catch tab 1126 of each first arm 1106*a* snaps behind the ledge 1140 (FIG. 11G). When this happens, the first and second U-shaped members 1102*a,b* are in their locked position. In this position, since the thickness t (see FIG. 11A) of the portion of the retainer 1100 adjacent to the portion of the opening 1166 that receives the third outer surface 34 of the first member 12 is increased to a size that is substantially equal to the width of the groove between the locking sleeve 48 and the collar 16, the retainer 1100 maintains the locking sleeve 48 in its locked position, thereby preventing involuntary movement of the locking sleeve 48 to its unlocked position.

To permit disconnection of the coupling assembly 10, the first and second U-shaped members 1102*a,b*, with the assistance of a tool to dislodge the catch tabs 1126 from the shelves 1140, are moved away from each other to the unlocked position. In this position, the portion of the retainer 1100 that is adjacent to the portion of the opening 1166 that receives the third outer surface 34 of the first member 12 has a thickness that is less than the width of the groove between the locking sleeve 48 and the collar 16, thereby permitting movement of the locking sleeve 48 to its unlocked position.

The retaining devices described above and illustrated in the figures have several advantages. First, since the retaining devices are configured to be pre-installed on the male coupling member of the coupling assembly, installers do not have to handle a separate retaining component. Second, since the retaining devices are configured to stay on the male coupling member even after disconnection of the coupling assembly, it is less likely that the retaining device will get lost.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A coupling assembly comprising:

a first member extending from a leading end to a trailing end and having an outer surface;

a first resiliently expandable locking element disposed about the outer surface of the first member and defining a first locking surface;

a second member extending from a receiving end to a remote end, the second member having an inner surface sized to receive at least a portion of the first member and an inwardly facing groove extending outwardly from the inner surface, the groove being at least partially defined by a second locking surface that extends outwardly from the inner surface towards the remote end of the second member;

a locking sleeve disposed about and axially movable with respect to the outer surface of the first member between unlocked and locked positions; and a second resiliently expandable locking element disposed about the outer surface of the first member between the locking sleeve and the first resiliently expandable locking element, wherein, after insertion of the first member into the second member and upon movement of the locking sleeve from its unlocked position to its locked position, the locking sleeve forces the second resiliently expandable locking element to expand radially outward, such that it becomes trapped between the first locking surface of the first resiliently expandable locking element and the second locking surface of the second member, thereby locking the first and second members together.

2. The coupling assembly of claim 1, wherein the first resiliently expandable locking element is positioned in an outwardly facing groove that extends inwardly from the outer surface of the first member.

3. The coupling assembly of claim 1, wherein the first resiliently expandable locking element is a split, resiliently expandable locking ring.

4. The coupling assembly of claim 1, wherein the locking sleeve includes a conical surface at its forward end.

5. The coupling assembly of claim 1, wherein the second resiliently expandable locking element is a split, resiliently expandable locking ring.

6. The coupling assembly of claim 5, wherein the split locking ring has a circular cross-section.

7. The coupling assembly of claim 1, further comprising a retaining clip configured to maintain the locking sleeve in its locked position.

8. The coupling assembly of claim 1, further comprising an annular sealing member positioned in an outwardly facing groove that extends inwardly from the outer surface of the first member, the sealing member configured to sealing engage another inner surface of the second member upon insertion of the first member into the second member.

9. The coupling assembly of claim 1, further comprising a biasing element configured to bias the locking sleeve to its locked position.

10. A coupling assembly comprising:

first and second members movable with respect to each other between uncoupled and coupled positions;

the first member extending from a leading end to a trailing end, the first member having an outer surface and a first locking surface that extends outwardly from the outer surface towards the leading end of the first member, the second member extending from a receiving end to a remote end, the second member having an inner surface and an inwardly facing groove extending outwardly from the inner surface, the groove being at least partially defined by a second locking surface that extends outwardly from the inner surface towards the remote end of the second member, a locking sleeve disposed about and axially movable with respect to the outer surface of the first member between unlocked and locked positions, a biasing element configured to bias the locking sleeve to its locked position; and a resilient locking element disposed about the outer surface between the locking sleeve and the first locking surface of the first member, the locking element being movable between contracted and expanded positions by the locking sleeve, wherein the locking element engages the outer surface of the first member in its contracted position and is moved radially outward in its expanded position, such that it is disengaged from the outer surface of the first member and engages the locking sleeve and the first locking surface of the first member, wherein the locking element is in its expanded position and the locking sleeve is in its locked position when the first and second members are in the uncoupled position, wherein, upon insertion of the first member into the second member, the locking element is forced to move from its expanded position to its contracted position, thereby forcing the locking sleeve to move rearward against the urging of the biasing element, wherein, upon continued insertion of the first member into the second member and once the locking element is generally aligned with the groove in the second member, the biasing element forces the locking sleeve to move forward causing the locking element to move radially outward from its contracted position to its expanded position, such that it becomes trapped between the first locking surface of the first member and the second locking surface of the second member, thereby locking the first and second members together.

11. The coupling assembly of claim 10, wherein the first member has a radially extending collar in the vicinity of the locking sleeve.

12. The coupling assembly of claim 11, wherein the biasing element is disposed between the collar and the locking sleeve.

13. The coupling assembly of claim 10, wherein the biasing element is a coil spring wave washer.

14. The coupling assembly of claim 10, wherein the biasing element is a compression spring.

15. The coupling assembly of claim 10, wherein the first locking surface is defined by a surface of a support element positioned in an outwardly facing groove that extends inwardly from the outer surface.

16. The coupling assembly of claim 15, wherein the support element is a split, resiliently expandable locking ring.

17. The coupling assembly of claim 10, wherein the first locking surface is defined by a chamfered surface of a rib extending outwardly from the outer surface.

18. The coupling assembly of claim 17, wherein the rib has a trapezoidal profile when viewed in cross-section.

19. The coupling assembly of claim 10, wherein the locking element is a split, resiliently expandable locking ring.

20. A retainer for use with an axially displaceable coupling assembly to maintain the coupling assembly in its connected position and/or prevent involuntary disconnection of the coupling assembly, the coupling assembly including male and female couplings, the retainer comprising:

first and second U-shaped members, each of which includes a pair of spaced-apart arms extending from a base portion and terminating at ends, wherein at least one of the arms of the first U-shaped member includes a groove configured to receive one of the arms of the second U-shaped member to permit sliding engagement between the first and second arms of respective U-shaped members, such that the first and second U-shaped members are movable between first and second positions, the first and second members defining an opening therebetween that is sized to receive the male coupling when the first and second U-shaped members are in sliding engagement with each other, wherein, when moved between their first and second positions, the first and second members are configured to vary the size of the opening and the thickness of the retainer adjacent the opening, wherein, when the first and second members are moved to the first position, the thickness of the retainer adjacent the opening is sized to permit disconnection of the coupling assembly, wherein, when the first and second members are moved to the second position, the thickness of the retainer adjacent the opening is increased to a size that maintains the coupling assembly in its connected position.

21. The retainer of claim 20, wherein at least one of the arms of each U-shaped member has a sloped portion that gradually decreases in thickness in a direction towards its end.

22. A coupling assembly comprising:

first and second members movable with respect to each other between uncoupled and coupled positions;

the first member extending from a leading end to a trailing end, the first member having an outer surface and a first locking surface that extends outwardly from the outer surface towards the leading end of the first member, the second member extending from a receiving end to a remote end, the second member having an inner surface and an inwardly facing groove extending outwardly from the inner surface, the groove being at least partially defined by a second locking surface that extends outwardly from the inner surface towards the remote end of the second member, a locking sleeve disposed about and axially movable with respect to the outer surface of the first member between unlocked and locked positions, a biasing element configured to bias the locking sleeve to its locked position; and a resilient locking element disposed about the outer surface between the locking sleeve and the first locking surface of the first member, the locking element being movable between contracted and expanded positions by the locking sleeve, wherein the locking sleeve is in its locked position and the locking element is in its expanded position when the first and second members are in their uncoupled position, wherein, upon insertion of the first member into the second member, the locking element moves from its expanded position to its contracted position and the locking sleeve moves rearward against the urging of the biasing element, wherein, upon continued insertion of the first member into the second member and once the locking element is generally aligned with the groove in the second member, the biasing element forces the locking sleeve to move forward forcing the locking element to move radially outward from its contracted position to its expanded position, such that it becomes trapped between the first locking surface of the first member and the second locking surface of the second member, thereby locking the first and second members together.

23. The coupling assembly of claim 22, wherein the biasing element is a compression spring.

24. The coupling assembly of claim 22, wherein the first locking surface is defined by a surface of a support element positioned in an outwardly facing groove that extends inwardly from the outer surface.

25. The coupling assembly of claim 24, wherein the support element is a split, resiliently expandable locking ring.

26. The coupling assembly of claim 22, wherein the first locking surface is defined by a chamfered surface of a rib extending outwardly from the outer surface.

27. The coupling assembly of claim 22, wherein the locking element is a split, resiliently expandable locking ring.

* * * * *